(12) United States Patent
Rivere

(10) Patent No.: US 9,740,999 B2
(45) Date of Patent: Aug. 22, 2017

(54) REAL TIME CUSTOMER ACCESS TO LOCATION, ARRIVAL AND ON-SITE TIME DATA

(71) Applicant: MobiWork, LLC, Delray Beach, FL (US)

(72) Inventor: Herve Rivere, Delray Beach, FL (US)

(73) Assignee: MobiWork, LLC, Delray Beach, FL (US)

(*) Notice: Subject to any disclaimer, the term of this patent is extended or adjusted under 35 U.S.C. 154(b) by 261 days.

(21) Appl. No.: 13/649,693

(22) Filed: Oct. 11, 2012

(65) Prior Publication Data

US 2013/0090965 A1   Apr. 11, 2013

Related U.S. Application Data

(60) Provisional application No. 61/545,918, filed on Oct. 11, 2011, provisional application No. 61/545,957, filed on Oct. 11, 2011.

(51) Int. Cl.
G06Q 10/00 (2012.01)
G06Q 10/06 (2012.01)

(52) U.S. Cl.
CPC .............. *G06Q 10/06311* (2013.01)

(58) Field of Classification Search
CPC .. G06Q 10/00; G06Q 40/00; G06Q 10/06311; G06F 17/60
USPC ........................................ 705/7.15
See application file for complete search history.

(56) References Cited

U.S. PATENT DOCUMENTS

| | | |
|---|---|---|
| 4,009,375 A | 2/1977 | White et al. |
| 4,891,650 A | 1/1990 | Sheffer |
| 5,182,705 A | 1/1993 | Barr et al. |
| 5,458,123 A | 10/1995 | Unger |
| 5,552,772 A | 9/1996 | Janky et al. |
| 5,561,706 A | 10/1996 | Fenner |
| 5,652,570 A | 7/1997 | Lepkofker |
| 5,712,899 A | 1/1998 | Pace, II |
| 5,734,706 A | 3/1998 | Windsor et al. |

(Continued)

OTHER PUBLICATIONS

U.S. Appl. No. 13/649,714, filed Oct. 11, 2012, Method and System to Record and Visualize Type, Time and Duration of Moving and Idle Segments.

(Continued)

*Primary Examiner* — Romain Jeanty
(74) *Attorney, Agent, or Firm* — Robert C. Kain, Jr.

(57) ABSTRACT

The method provides real time task-related data to customers seeking services by a vendor's task person (T-P) at a customer location. The T-P has a GPS-enabled phone-tablet-device linked by a network to a task collection database which includes data on task, customer, location, T-P, and current location. The customer is permitted to access the database showing location, the time and/or distance of T-P, the projected time of arrival, duration, and time of completion. The customer selects a communications channel for call ahead time and delay notice. Additionally, the system and method may be deployed over a distributed computed system which includes a supplemental computer and a supplemental database. The web based server forwards to the supplemental computer and supplemental database the customer selected communications channel, mode, call ahead and delay data.

29 Claims, 17 Drawing Sheets

(56) References Cited

U.S. PATENT DOCUMENTS

| | | |
|---|---|---|
| 5,734,837 A | 3/1998 | Flores et al. |
| 5,754,857 A | 5/1998 | Gadol |
| 5,936,572 A | 8/1999 | Loomis et al. |
| 6,098,048 A | 8/2000 | Dashefsky et al. |
| 6,154,727 A | 11/2000 | Karp et al. |
| 6,202,023 B1 | 3/2001 | Hancock et al. |
| 6,295,513 B1 | 9/2001 | Thackston |
| 6,415,284 B1 | 7/2002 | D'Souza et al. |
| 6,509,830 B1 | 1/2003 | Elliott |
| 6,553,407 B1 | 4/2003 | Ouchi |
| 6,615,184 B1 | 9/2003 | Hicks |
| 6,687,609 B2 | 2/2004 | Hsiao et al. |
| 6,731,238 B2 | 5/2004 | Johnson |
| 7,051,273 B1 | 5/2006 | Holt et al. |
| 7,102,510 B2 | 9/2006 | Boling et al. |
| 7,142,892 B2 | 11/2006 | Dennis et al. |
| 7,155,519 B2 | 12/2006 | Lo et al. |
| 7,206,568 B2 | 4/2007 | Sudit |
| 7,246,746 B2 | 7/2007 | McNamara et al. |
| 7,249,045 B2 | 7/2007 | Lauffer |
| 7,295,119 B2 * | 11/2007 | Rappaport et al. ........ 340/572.4 |
| 7,372,365 B2 | 5/2008 | Jackson |
| 7,516,082 B2 * | 4/2009 | Sanville et al. ............. 705/7.26 |
| 7,688,185 B1 | 3/2010 | McKethan |
| 7,756,293 B2 | 7/2010 | Kuwabara et al. |
| 7,769,617 B2 * | 8/2010 | Iwasaki et al. .............. 705/7.26 |
| 7,839,882 B2 * | 11/2010 | Soliman ................ H04W 24/02 370/437 |
| 7,945,470 B1 * | 5/2011 | Cohen et al. ................ 705/7.13 |
| 8,136,114 B1 * | 3/2012 | Gailloux et al. ............. 718/104 |
| 8,219,468 B2 * | 7/2012 | Fisher et al. .................... 705/29 |
| 8,239,249 B1 * | 8/2012 | Belko et al. ................. 705/7.14 |
| 8,548,734 B2 | 10/2013 | Barbeau et al. |
| 8,577,401 B1 * | 11/2013 | Osinga .......................... 455/466 |
| 8,706,542 B2 * | 4/2014 | O'Meara et al. ............ 705/7.16 |
| 8,788,375 B2 * | 7/2014 | Podgurny et al. .............. 705/32 |
| 9,123,005 B2 * | 9/2015 | Rivere ................... G06Q 10/06 |
| 2004/0085909 A1 * | 5/2004 | Soliman ................ H04W 24/02 370/252 |
| 2004/0267595 A1 | 12/2004 | Woodings et al. |
| 2005/0021428 A1 | 1/2005 | Costello |
| 2005/0202830 A1 | 9/2005 | Sudit |
| 2005/0202831 A1 | 9/2005 | Sudit |
| 2005/0202832 A1 | 9/2005 | Sudit |
| 2005/0202834 A1 | 9/2005 | Sudit |
| 2006/0022048 A1 | 2/2006 | Johnson |
| 2006/0047548 A1 | 3/2006 | Ulmer et al. |
| 2006/0055536 A1 | 3/2006 | Jackson |
| 2006/0126620 A1 | 6/2006 | Bonar et al. |
| 2006/0206370 A1 | 9/2006 | Skopal |
| 2006/0258370 A1 | 11/2006 | Sudit et al. |
| 2007/0060171 A1 | 3/2007 | Sudit et al. |
| 2007/0162537 A1 | 7/2007 | Juncker |
| 2007/0264974 A1 | 11/2007 | Frank et al. |
| 2007/0282479 A1 | 12/2007 | Shibuya et al. |
| 2007/0282722 A1 | 12/2007 | Ducolon et al. |
| 2007/0287473 A1 | 12/2007 | Dupray |
| 2008/0014964 A1 | 1/2008 | Sudit et al. |
| 2008/0052346 A1 | 2/2008 | Bassat et al. |
| 2008/0091498 A1 | 4/2008 | Chiverton et al. |
| 2008/0171559 A1 | 7/2008 | Frank et al. |
| 2010/0069035 A1 | 3/2010 | Johnson |
| 2010/0076898 A1 | 3/2010 | Beshears et al. |
| 2012/0203589 A1 | 8/2012 | Eggena et al. |
| 2013/0090965 A1 * | 4/2013 | Rivere ............. G06Q 10/06311 705/7.15 |
| 2013/0090969 A1 * | 4/2013 | Rivere ................... G06Q 10/06 705/7.19 |

OTHER PUBLICATIONS

U.S. Appl. No. 13/649,876, filed Oct. 11, 2012, Method and System to Define Implement and Enforce Workflow of a Mobile Workforce.
U.S. Appl. No. 13/649,737, filed Oct. 11, 2012, Method and System to Record and Visualize Type, Path and Location of Moving and Idle Segments.
U.S. Appl. No. 13/649,753, filed Oct. 11, 2012, Method and System to Analyze Time Stamp Location Data to Produce Movement and Idle Segments.
U.S. Appl. No. 13/649,773, filed Oct. 11, 2012, Time on Site and Point of Interest Tracker with Privacy Block.

* cited by examiner

FIG. 2A

Activities Today

| Title | User | Time | Work Order (WO) - Task | Customer | Action |
|---|---|---|---|---|---|
|  |  |  |  |  |  |
|  |  |  |  |  |  |

FIG. 2B

Customers

| Name | Address | Primary Contact | Actions |
|---|---|---|---|
|  |  |  |  |
|  |  |  |  |

FIG. 2C

Work Orders

| File Type | Customer | Location | Status | Date-Time | Assigned to Task Person | Confirm | Action |
|---|---|---|---|---|---|---|---|
|  |  |  |  |  |  |  |  |
|  |  |  |  |  |  |  |  |

FIG. 2D

Equipment

| Type | Ser. No. | Work Order | Customer Name | Action |
|---|---|---|---|---|
|  |  |  |  |  |
|  |  |  |  |  |

FIG. 2E

Work Order Reports

| Customer | |
|---|---|
| Equipment Ser. No. | |
| Creation Date From | |
| Creation Date to | |
| Report Format | fnc. Sel.: Excel, QuatroPro, Word |
| Create Report | fnc: YES |

FIG. 2F

Balance Sheet

| Customer | |
|---|---|
| fnc: create report | YES |

FIG. 2G

Tasks

| File type | ID | Status | Category | Description | Date | Action | Status |
|---|---|---|---|---|---|---|---|
| | | | | | | | |
| | | | | | | | |

FIG. 2H

Users

| Login ID | Name | Status | Action |
|---|---|---|---|
| | | | |
| | | | |

FIG. 2I

Partners

| Name | Co. Name | Ph No. | Email | Status | Action |
|------|----------|--------|-------|--------|--------|
|      |          |        |       |        |        |
|      |          |        |       |        |        |

FIG. 2J

Devices

| Make | Model | User Name | Last Update time | Action |
|------|-------|-----------|------------------|--------|
|      |       |           |                  |        |
|      |       |           |                  |        |

FIG. 2K

Products

| Id | Name | SKU# | Price | Quantity | Actions |
|----|------|------|-------|----------|---------|
|    |      |      |       |          |         |
|    |      |      |       |          |         |

FIG. 3A
Configured Table - Initial Screen (includes new notifications, new WOs, Wos)

New Notifications

| Type | ID | Date | Description | fnc: View (V) | fnc: Accept (ACC) | fnc: delete (DEL) |
|---|---|---|---|---|---|---|
| alarm | 123 | 10.10.2011 | low batty | user select | u-sel | u-sel |
| alarm | 564 | 10.10.2011 | confirm telecom | u-sel | u-sel | u-sel |
|  |  |  |  |  |  |  |

New/Unassigned Work Orders ("WO")

| ID/Title | Customer/Loc | Status | Date | Action |
|---|---|---|---|---|
| 34 (WO 034) | John Bee 900 S. Terrace Miami, FL 123A | open | 10.15.2011 | fnc: V, ACC, DEL |
| more | etc | etc |  |  |
|  |  |  |  | X-Table Fnc: pg. 2, pg. 3, etc. |

Assigned Work Orders (no. WO's)

| ID/Title | Customer/Loc | Status | Date | Assigned to | Confirm | Action |
|---|---|---|---|---|---|---|
| 34 (WO 034) | John Bee 900 S. Terrace Miami, FL 123A | open | 10.15.2011 | Dean Smith, Ph: 345-3-260 | pending (Alt: YES, NO) | fnc: V, ACC, DEL |
| more | etc | etc |  |  |  |  |
|  |  |  |  |  |  | XT-fnc: pg. 2, 3, 4 |

Activities Today

| Title | User | Time | WO/Task | Customer | Actions |
|---|---|---|---|---|---|
|  |  |  |  |  | fnc: V, ACC, DEL |
|  |  |  |  |  | XT-fnc: pg. 2, 3, 4 |

FIG. 3B

Configured Table - New Notifications

| Alarm 123 | | | |
|---|---|---|---|
| Message | data | Status | data (ack, pend, NO) |
| Acknowledge day | date data | Create date | data |
| Acknowledge who | person data | Close date | data |
| System alarm (criticality) | critical data type | Closed by who | person data |

FIG. 3C

Configured Table - Assigned Work Orders (WO) - Main Menu

| Menu Fnc: | Summary | Equip | Notes | Docs | Forms | Activity | Bills | History |
|---|---|---|---|---|---|---|---|---|
| Status | Assigned: Y, N, pending | | | | Confirm Status | | pend, not assigned | |
| Created | date data | | | | | | Misc. Fnc: Input | |
| Customer | name | | addr. | | Ph. No. | | See More Data | |
| Location | data | | addr. | | Ph. No. | | Mark Critical | |
| Assigned to | person data | | email | | ph. No. | | Ack Done | |
| Appointment | appt. data | | travel time (est) | | time-on-site (est) | | Add Data Input | |
| Est. Duration | time span data | | travel time (actual) | | time-on-site (actual) | | | |

FIG. 3Ca
Configured Table - Assigned Work Orders (WO) - Main Menu

| Menu Fnc: | Summary | Equip | Notes | Docs | Forms | Activity | Bills | History |
|---|---|---|---|---|---|---|---|---|
| Status | Assigned: Y, N, pending | | | | Confirm status | | pend, not assigned | |
| Created | date data | | | | | | Misc. fnc: Input | |
| Customer | name | | addr. | | ph. no. | | fnc: More Data | |
| Location | data | | addr. | | ph. no. | | fnc: Critical task | |
| Assigned to | person data | | email | | ph. no. | | fnc: Ack Done | |
| Appointment (appt) | appt. data | | travel time (est) | | time-on-site (est) | | fnc: Add Data | |
| Est. Duration | time span data | | travel time (actual) | | time-on-site (actual) | | | |
| Customer Alerts | est. arrival: Y/N | | call ahead: Y/N | | delay note: Y/N | | fnc:V Cust-Not | |

FIG. 3Ea
Configured Table - Assigned Work Orders (WO) - Notes Table
Menu Fnc:   Summary   Equip Notes Docs   Forms   Activity   Bills   History

| Notes | Cust. Note | Date | User-pull down list: Task Person, Mgr., Sys Op. | Visible by Customer | Actions |
|---|---|---|---|---|---|
| data | | data | | YES/NO | Fnc. |
| water leak all over 1st floor | Cust. | 3-11 | | YES | fnc: V, ACK |
| Cust. audio | Cust. | 3-11; 9AM | | YES | fnc: listen, ACK |

FIG. 3D

Configured Table - Assigned Work Orders (WO) - Equipment Table

| Menu Fnc: | Summary | Equip | Notes | Docs | Forms | Activity | Bills | History |
|---|---|---|---|---|---|---|---|---|
| Equipment Type | Problem Descript. | | Resolution | | Actions | | Fnc. | |
| Data | data | | data | | | | | |

FIG. 3E

Configured Table - Assigned Work Orders (WO) - Notes Table

| Menu Fnc: | Summary | Equip | Notes | Docs | Forms | Activity | Bills | History |
|---|---|---|---|---|---|---|---|---|
| Notes | Date | | User-pull down list: Task Person, Mgr., Sys Op., etc. | | | Visible by Customer | Actions | |
| data | data | | | | | YES/NO | Fnc. | |

FIG. 3F

Configured Table - Assigned Work Orders (WO) - DocumentTable

| Menu Fnc: | Summary | Equip | Notes | Docs | Forms | Activity | Bills | History |
|---|---|---|---|---|---|---|---|---|
| User List sel | Date | | Type | | Doc Name | Comment | Action - fnc. | |
| Data | data | | etc. | | | | | |

FIG. 3G

Configured Table - Assigned Work Orders (WO) - Form Table

| Menu Fnc: | Summary | Equip | Notes | Docs | Forms | Activity | Bills | History |
|---|---|---|---|---|---|---|---|---|

Data Processing Note: Convert Customer Form into Data Entry Forms

FIG. 3H

Configured Table - Assigned Work Orders (WO) - Activity Table

| Menu Fnc: | Summary | Equip | Notes | Docs | Forms | Activity | Bills | History |
|---|---|---|---|---|---|---|---|---|
| User | Date | | Time | | Duration | | Action | |
| | | | | | | | fnc. | |

FIG. 3I

Configured Table - Assigned Work Orders (WO) - Bills Table

| Menu Fnc: | Summary | Equip | Notes | Docs | Forms | Activity | Bills | History |
|---|---|---|---|---|---|---|---|---|
| Type | Name-descript | Price | Quantity | Rebate | Tax | Total | Action: fnc. | |
| Data | data | etc | | | | | | |
| | | | | | | | | |
| BALANCE | | | | | | | | |
| | | data | invoice no. | amt. bill | amt. Cr. | Bal. | | |

FIG. 3J

Configured Table - Assigned Work Orders (WO) - History Table

| Menu Fnc: | Summary | Equip | Notes | Docs | Forms | Activity | Bills | History |
|---|---|---|---|---|---|---|---|---|
| date/time | | | Activity type | | descript | | user | |
| data | | | | | | | | |

FIG. 3K

Configured Tables - Main Menu - Top Level Selections

| Main Menu Sel: | Home | Customers | Work Orders | Tasks | Activity | Account | Help |
|---|---|---|---|---|---|---|---|
| sub-menus | | | Work Orders | Tasks | Schedules | See below | |
| | | | Equip | Reports | Notifications (s-2d) | | |
| | | | Reports (sub - 2d) | | Locations (s-2d) | | |
| | | | | | Reports (s-2d) | | |

Account Sub menus: Users, Partners, Devices, Products, Settings, My Settings, Admin
Reports Sub-2d ("s-2d"): Work Orders; Balance Sheet
Notification Sub-2d: Notifications, Messages, Alarms
Locations Sub-2d: Last Known, Task Person Time Sheet; Task Person Geo Path
Reports Sub-2d: Activity Report FIG. 3L
Configured Tables - Activity - Schedule Fnc: Daily Sel.; Monthly Sel; etc.
    Fnc.: Select User
    Fnc.: Select all users by group
    Fnc.: Select User y Smart Phone Device
    Fnc.: sel. geo. device or group geo. device Display Daily Calendar as per user selection (U-sel)
```
Time Block   Person A     Person B     Person C
8:00AM1      xx           xx           xx
8:30AM
9:00AM                    xx           xx
etc.
```

FIG. 3M

Configured Tables - Activity - Notifications

Fnc:   Daily Sel.; Monthly Sel; etc.
        Fnc.: Select User
        Fnc.: Select all users by group
        Fnc.: Select User by Smart Phone Device
        Fnc.: sel. geo. device or group geo. device Display Daily Calendar

| Time Block | Person A | Person B | Person C |
|---|---|---|---|
| 8:00AM | | | |
| 8:30AM | xx | | |
| 9:00AM | | | xx |
| etc. | | | |

FIG. 3N

Configured Tables - Activity - Location - Last Known

Display Geo Map with Location Pointer ("Loc. Ptr.")
        Fnc.: Show all smart phones in group
        Fnc.: Select User with Smart Phone
        Fnc.: sel. geo. device or group of geo. devices DISPLAY GOOGLE MAP HERE with loc. Ptr(s).

FIG. 3O

Configured Tables - Activity - Location - Timesheet Tracker

Fnc: Daily Sel.; Monthly Sel; etc.
        Fnc.: Select User and user assigned devices
        Fnc.: Select all users by group
        Fnc.: Select Smart Phone Device or group or smart phones
        Fnc.: sel. geo. device or group geo. device Display Daily Calendar

| Time Block | Task Person A | Task Person Smart Phone | Task Person Comp. Tablet |
|---|---|---|---|
| 8:00AM | data | data | data |
| 8:30AM | | | xxx |
| 9:00 | ccc | ccc | |
| etc. | | | |

FIG. 3P

Configured Tables - Activity - Location - Geo Tracker

Display Geo Map with Location Pointer (:Loc. Ptr.")
    Fnc.: Show all smart phones in group
    Fnc.: Select User with Smart Phone
    Fnc.: Select all users in a group
    Fnc.: sel. geo. device or group of geo. devices DISPLAY GOOGLE MAP HERE with loc. ptr(s)

| Critical Marker/ Type | Status | Time - start time and time on site | Approx. - distance |
|---|---|---|---|
| data | idle, moving, out of range | data | data |
|  | Total | data | data |

FIG. 3Q

Configured Tables - Activity - Reports

Activity Id
User (select pull down menu)
Customer
From: day input or display "select calendar"
To: day input or display "select calendar"

FIG. 3R

Configured Tables - Account - All Submenus

Account Sub menu: Users, Partners, Devices, Settings, My Settings, Admin
Data processing note: Common configuration tables, customizable, extendable

FIG. 4

| Customer Name (C or Cust) | Cust Contacts (data fixed) | Est. Arrival Time | Est. Time on Site | Est. bill; Task Person (T-P) |
|---|---|---|---|---|
| Cust. Loc. | task descript. ID | [sys: ON/OFF] | [sys: ON/OFF] | [sys: ON/OFF] |
|  | Cust Data (auto populate) | Arrival Notice (call ahead) | Call Ahead time (C-sel) time | Delay Notice (sys. set 60 min) |
| Primary Contact | Home Ph | C-sel (one only) | 30 or 60 min | C-sel (one only) |
|  | Ofc. Ph | C-sel (one only) | C-sel (one only) | C-sel (one only) |
|  | Cell Ph | C-sel (one only) | C-sel (one only) | C-sel (one only) |
|  | Cell Ph - sms | C-sel (one only) | C-sel (one only) | C-sel (one only) |
| [sys: P/W sent] | email | C-sel: Y/N | C-sel: Y/N | C-sel: Y/N |
| Second Contact | same | same | same | same |
| Add Notes | data here | [sys: ACK, Mgr. notice, T-P note] | fnc: critical, call back | fnc: write, del, save, view |
| Add Audio note | [sys: active?] | [sys send note] | [Mgr. ACK] | [T-P ACK] |

Programmer Notes: Items in brackets not visible to Customer. "C-sel" refers to a Customer selection option. Items underlined are customer input. Sys. Op. has initial input on these items.

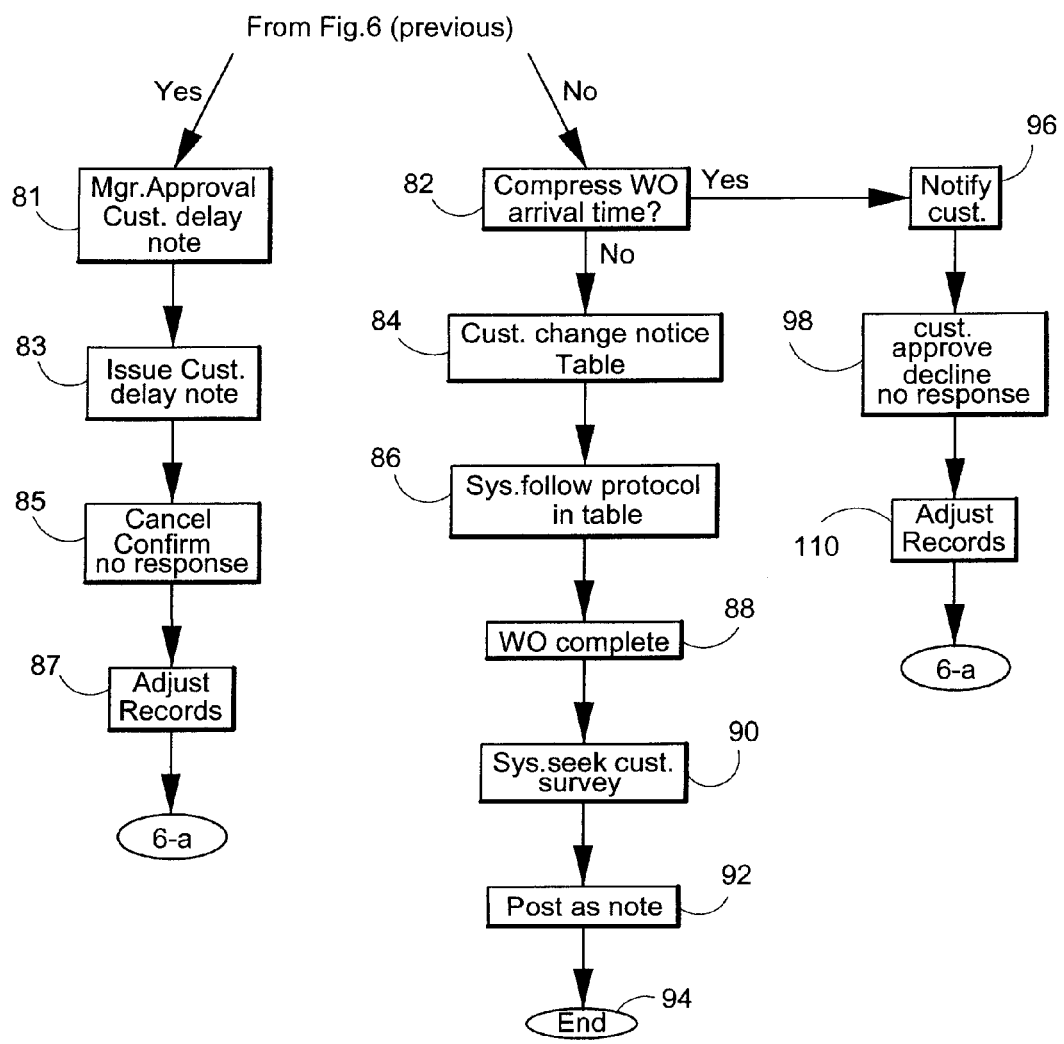
FIG.6 (con't)

REAL TIME CUSTOMER ACCESS TO LOCATION, ARRIVAL AND ON-SITE TIME DATA

This is a regular patent application based upon and claiming the benefit of provisional patent application Ser. No. 61/545,918, filed Oct. 11, 2011 and provisional patent application Ser. No. 61/545,957, filed Oct. 11, 2011, and priority is claimed from those provisional patent applications, the contents of which are incorporated herein by reference thereto.

The present invention relates to a computer-based method, system and computer program which provides access to real time task-related data to customers (consumers and businesses) seeking services, goods or consultations at a customer task situs location from a task person or mobile worker assigned to the unique customer or business task. GPS data from the mobile worker's assigned GPS-enabled phone, computer tablet or electronic device is converted into time, location and projected time-of-arrival data and the same is posted on a secure customer portal.

BACKGROUND OF THE INVENTION

Conventional workforce management systems are typically designed to optimize and solve the problems faced by the mobile workforce but very few have concentrated on the need of their customers and on ways to improve the overall customer service experience. A few systems offer a web based customer interface that provides limited information or interaction capabilities. All mobile workforce/field service companies (e.g. cable, repair, delivery personnel) typically only provide a large time based windows ("in the morning", from 8:00 to 11:00 AM) to their customers. In turn the customers must make sure they are in the corresponding location (the customer situs location) during that entire projected "arrival time" span. There is a need for a customer to be able to access the real time location and estimated arrival time of the corresponding mobile worker assigned to the task.

Numerous systems and methods exist for automatically tracking the location of users. Such tracking may be performed to support context-aware applications, to provide location-based services, or for a variety of other reasons. Tracking of users is often performed by tracking the location of a device or object uniquely associated with the user. For example, numerous mobile devices carried by users today include technology that enables the location of such devices to be determined with varying degrees of accuracy. Such technology may include but is not limited to Global Positioning System (GPS) technology, Wi-Fi technology, cellular telephony technology and Bluetooth™ technology.

There is a need for a system, method and a service to perform location tracking limited to the context of the business (e.g. location of a customer, of a partner, or a task team member) non-intrusively enabling a user-customer-business to seek limited location information associated with the mobile worker.

It is well known that service men and women and sales persons who visit customer locations throughout a wide geographic territory are oftentimes delayed in meeting appointment times. These appointment times are set, in advance to provide service, repair and goods to the customer at the customer location or site or to engage the customer in conversations and demonstrations in an effort to sell goods or services to the customer. With the advent of GPS-enabled electronic devices (cellular telephones, smart phones, tablet computers and other devices having GPS-enabled circuitry), it is easier for the person assigned to the task (the service man or salesman) to locate the customer. However, a problem still exists if a number of customers are scheduled for a single day or if the task person must visit other stores or locations to collect additional service personnel or equipment or supplies (vendor locations) in order to complete the task at the customer's location.

Databases and spreadsheets (a spreadsheet being a two dimensional database) have been developed to provide customer service and improve customer relations through the use of computer programs and computer systems. Notwithstanding these tools, business have experienced difficulty in monitoring mobile work forces and sales forces which need to visit the customer site to close a sale or repair equipment or provide other services at the customer's location. The present system and method seeks to solve problems associated with a mobile workforce.

The system and method uses generic off-the-shelf smartphones (with built-in GPS support (either standalone or assisted GPS)) with custom software, generic servers and custom software for telephony based access (both inbound and outbound if the customer requested to be notified asynchronously).

OBJECTS OF THE INVENTION

It is an object of the present invention to provide a customer with information regarding when a task person will arrive at his or her home or business to deliver goods, services or consultations to the customer. Arrival time, time on site and departure time data is also provided. These goods, services or consultations may include presentations to businesses as well as end user customers regarding services to be provided at the customer's task situs location, goods to be delivered to the customer or consultations such as sales presentations, educational consultations and other information.

It is another object of the present invention to provide a customer access system which permits and presents a display on the customer internet enabled device which list the task identifier, unique to the customer task, a task description, a projected time of arrival and the current location of the task person assigned to the unique task.

It is a further object of the present invention to provide a customer portal wherein the customer selects one of several communication channels (such as a primary cell phone and a secondary cell phone, customer selects one or the other) and a customer selection of a mode of communications (text message or voice message) thereby enabling the notification system to send call ahead or antecedent notice of arrival messages to the selected communications channel via the selected communications mode and a delay message, if needed.

It is an object of the present invention to provide a comprehensive mobile work force solution that improves work force capability, productivity and visibility as well as improve the quality of the customer experience.

The present system exploits the GPS features of a smart cellular telephone or a tablet computer with a web based platform which enables management and assigned task personnel to track, locate, capture data, and record events both automatically and manually to provide service to the business' customer.

It is another object of the present invention to provide an integrated platform for customers, work orders, tasks activities and parts and products inventory management and integrate smart phone features such as real time communication, location, navigation, audio information, image data, signature data and payment processing directly to the user's and customer's location.

Other objectives and advantages of the present invention are discussed later herein.

The invention also relates to computer based method, computer readable medium carrying the computer program and a computer system.

BRIEF DESCRIPTION OF THE DRAWINGS

Further objects and advantages of the present invention can be found in the detailed description of the preferred embodiments when taken in conjunction with the accompanying drawings in which:

FIGS. 2A-2K diagrammatically illustrate tables with database fields or spreadsheet fields for one embodiment of the invention.

FIGS. 3A-3R diagrammatically illustrate configured tables for another implementation of the present invention.

FIG. 3Ca is a revision of the configured assign work order main menu with a customer alert row;

FIG. 3Ea is a configured table assign work order, notes table showing customer notes;

FIG. 4 diagrammatically illustrates an example of a customer notification table.

SUMMARY OF THE INVENTION

Figure 1:
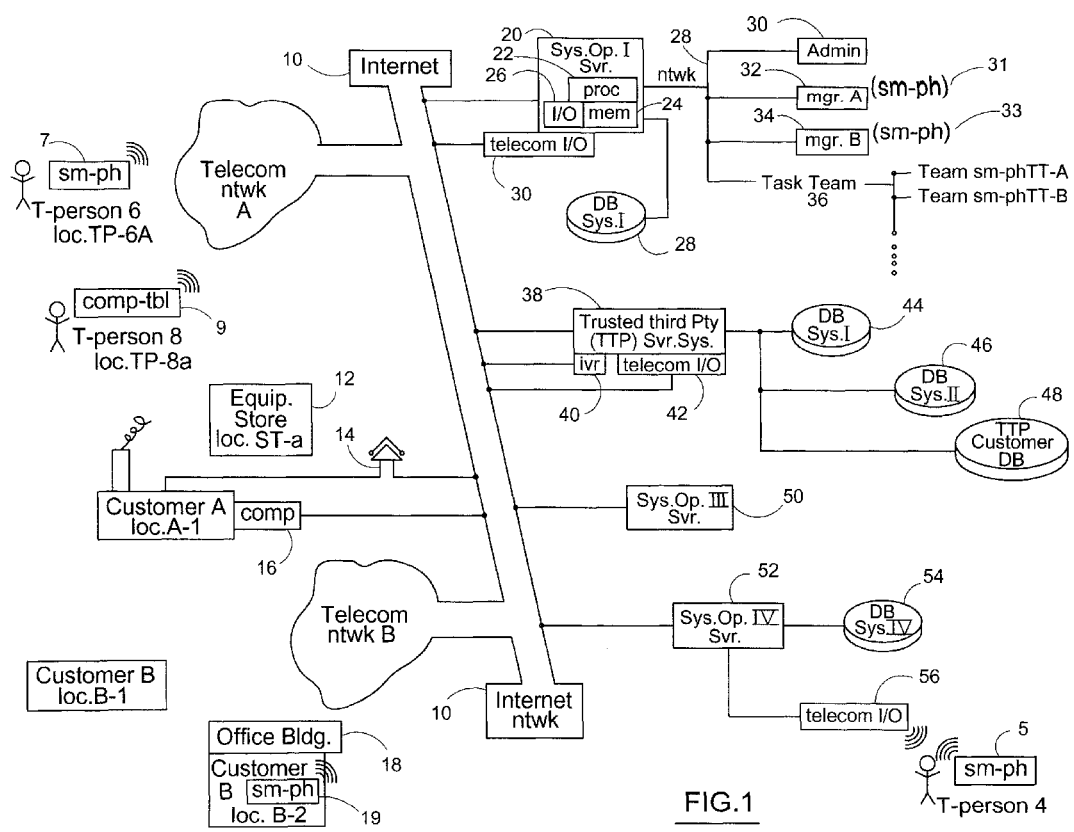
FIG. 1 diagrammatically illustrates a system diagram of the invention and various configurations of the method over a distributed computer system.

The computer based method, program and system provides real time task-related data to customers seeking services supplied by a task person (sent by a vendor) goods or consultations, such as sales presentations, at a customer task situs location. The customer may be an individual, home owner or a business. The vendor (or Sys. OP.) assigns a task person to the unique task. The task person or mobile worker has an assigned GPS-enabled phone, computer tablet or electronic device which is coupled to a telecommunications network. The customer has an internet-enabled communications device linked to the telecommunications network. The method and the system uses a database and a processor server. The database is populated with a plurality of tasks represented by unique task data collections, customer data, task person, assigned GPS-enabled device data and current location data. The current location data is the current location of the GPS-enabled device. The system and method permits a customer seeking the goods or service at the customer situs to access a secure web-based information portal showing (a) location of the task person or mobile worker, (b) the time and/or distance of the mobile worker to the task situs, (c) the projected time of arrival, (d) various task-related information such as the name of the assigned task person. The customer or business seeking the goods or service has secure access to the web-based portal and is permitted to (a) select a communications channel (one or several cell phones, for example), and a communications mode (voice, text message), (b) a call ahead time which gives the customer a heads up as to the projected arrival of the task person at the task situs and (c) a delay notice if the task person is delayed due to unforseen circumstances. The unique task data collection, in an enhanced version, sends a calendar alert to the customer. Additionally, the system and method may be deployed over a distributed computed system which includes a supplemental computer and a supplemental database. The web based server forwards to the supplemental computer and supplemental database the customer selected communications channel and mode as well as the selected time period for the antecedent "call ahead" message and channel and mode selection for the display message. The customer (as well as the task person or other registered user) may access the system via an ap (an access point) from a smart phone or via a voice telecommunications channel wherein the system employs an interactive voice response (IVR) module for the communication.

As an example of the dynamic use of the system implemented with a pool cleaning service, the customer may view projected time of arrival and subsequently actual time of arrival, time on-site (duration), time of departure, supplies used on-site, etc. Additionally, the task person can leave a message in the task data file for the customer and the customer can leave a message in the same data file for the task person and the system operator or manager.

The system is based on a plurality of components that are interconnected to provide the overall functionality. In its simplest incarnation, the system is made of the following components: (A) One component that captures, records and transmits the location of a mobile worker (typically through an associated device like a smart-phone with built-in GPS and a custom software) as well as other work order or business related information (sign in/out, lunch break, working on work order, etc.). (B) One component that receives, record and process the location of each individual mobile workers. (C) One component that combines typical CRM (customer relations management) and work order (WO) management features to capture the customer information (address, phone, etc.) and work order details (appointment time, place). (D) One component that process the locations to determine the corresponding distance, driving directions and associated estimated time of arrival. (E) One component that provides customer with a web based access to that information (access control) as well as edit and update capabilities (confirm appointment, "add note"). (F) One component that provides customer with a telephony based access to that information (access control) as well as edit and update capabilities (confirm appointment, add note). (G) Generic servers and custom software for web-based access and central processing.

The computer system has a web portal which effects a display of the task-related data on the customer internet-enabled device. The system maps the current location of the assigned task person on the displayable map. The system calculated the distance between the task person's GPS-enabled device to the task situs in miles or kilometers. The system calculates and updates time of arrival data and reposts time of arrival data thereby over writing the projected time of arrival in the unique task data collection. The server either calculates an updated time-of-arrival data based upon said current location data from the GPS-enabled device, then replaces the posted time-of-arrival with said updated time-of-arrival data as the projected time of arrival, OR the server calculates an updated distance to task situs based upon the current location data from the GPS-enabled device, and then posts distance to task situs as a proxy for the updated time-of-arrival data. The system further has voice modules to generate audible announcements of the projected time of arrival as well as the delay message, if necessary, the customer. Distance to situs may be used rather than projected time-of-arrival. A communications interfaces enables sending the text message and the interactive voice response (IVR) unit and text messenger modules permit generation of the appropriately formatted messages to the customer device. In a distributed system, the primary server processor has a store and forward module which updates the supplemental computer system and supplemental database.

DETAILED DESCRIPTION OF THE PREFERRED EMBODIMENTS

The present invention relates to a computer-based method, system and computer program which provides access to real time task-related data to customers (consumers and businesses) seeking services, goods or consultations at a customer task situs location from a task person or mobile worker assigned to the unique customer or business task. GPS data from the mobile worker's assigned GPS-enabled phone, computer tablet or electronic device is converted into time, location and projected time-of-arrival data and the same is posted on a secure customer portal. Similar numerals designate similar items throughout the patent specification. Some abbreviations in the drawings and the patent specification are identified in the Abbreviations Table at the end of the specification.

Basic System Description and Advantages

The system provides a comprehensive mobile workforce solution that improves workforce capability, productivity and visibility as well as the quality of the customer experience.

The system employs advanced software components, modules and data acquisition and processing methods which exploit the unique smartphone and computer tablet capabilities and a web-based platform enabling management and assigned task personnel to track, locate, capture data and record events both automatically and manually, thereby providing better service to the system operator's customers.

Customers, work orders, tasks, activities, parts/products and inventory management, forms, workflow automation, messaging and all the capabilities the smartphone brings (real-time communication, location, navigation, audio, image, signature, and payments) are seamlessly integrated into a series of user-friendly interfaces to empower the mobile workforce and provide a superior customer experience.

The system operator employs a web browser which is enabled at different levels of control for the front office, the back office, the assigned task person, task team members, management, and, to a limited extent to customers. These customizable interfaces provide real time results and time-and-location based planning and task execution. From the customer's view, he or she can now see the time-to-arrival and any impediments blocking the access to service, repair or sales call by viewing the customer portal.

The system uses smartphone capabilities (real-time communication, location, navigation, audio, image, signature, and payments) (also available from GPS enabled computer tablets and other GPS and telecom enabled devices) and integrates data from those devices with data from the front office, the back office, the task person, team members and management, and presents the same in an orderly fashion to the authorized party.

The system is suited for field services as well as other businesses that employ a fleet of mobile workers who execute activities outside of the office, such as sales, business development and customer service.

Application functionality and corresponding benefits are designed for mobile workers, managers, office coordinators and customers.

The GPS enabled cellphone, computer tablet or other electronic device with a telecom link is loaded with native applications that securely communicate over the Internet with the system operator servers, delivering inbound and outbound messages to track, exchange information and manage activities Office coordinators and management log in to web portals to create and update customer data, work orders, tasks, establish appointments, send notifications and access reports. The system is an extension of the system operator's customer relationship management (CRM) system and enterprise relationship program (ERP) enabling the system operator to extend its existing platform to the mobile world.

Customers are provided with access to a secure web portal to review appointments, create new orders and track workers on a time-based format and a geo location format. The system can be further integrated with interactive voice recognition (IVR) features to provide an audio phone based interface for customers.

The system improves workforce capability, productivity and visibility, which translates to cost and time savings, increased revenues and peace of mind. The system permits the system operator to configure a unique customer access portal to view a wide range of task person data (time to customer location, current location, estimated impediments, customer enabled input to add or alter customer contact data (home phone to cell phone to business phone). Accordingly, the customer is provided with more transparency and visibility, which results in a far superior customer experience and a competitive advantage.

Data acquisition and data processing modules are integrated together to provide a seamless and intuitive user interface at various control levels.

Customer Management Module (system operator ("Sys Op") controlled): Customers (including prospects), contacts, locations, custom forms, notes, history, appointments, customer relationship details such as previous work orders, documents, billing, invoices and payments, customizable processing rules, bulk provisioning, and reports.

Work Order Management Module: Drag and drop appointment scheduling, automated route planning (based on schedules, locations) and optimization, automated creation based on rules (service contracts), location based directions and navigation, notes, invoicing and payments, history, customer relationship details such as previous work orders, products/parts and inventory management, documents (audio, images), custom forms, signature capture, customizable processing rules, and reports.

Task Management Module: Drag and drop ordering, list management, expected completion dates and automated reminders, resource assignment, categories, access control, location based directions and navigation, documents (e.g. audio, images), customizable processing rules, and reports.

Activity Management Module: Drag and drop management of appointments, work orders and task scheduling, with real times updates to both office and mobile workers, automated time and travel tracking and billing with real location data (e.g. expense reports management), automated mobile worker location and movement tracking, time-on-site analysis, plan versus actual metrics for analysis and optimization.

Notifications (including emergencies and high risk situations) Module: Send/Receive alarms, messages, automated notifications reminders whenever attention is required. In case of an emergency, the task person-mobile worker can notify the Sys Op in two (2) clicks on the smart phone that the task person needs immediate and urgent help. In high risk working conditions, the automated watchdog mechanism immediately notifies the Sys Op if a mobile worker is not responding.

Account Management Module (web only designed for office): Extensive workflow automation framework (rules, filters, actions) to automatically exploit all the underlying information (e.g. automatically determining that a mobile worker is going to be late for an appointment), forms definition (including subforms and dynamic number of items), extensive set of customization parameters (including custom print views for forms, invoices and work orders), access control roles/permissions (template based as well as custom, individual and/or group of users), plus automated inventory.

The system and method is smartphone and GPS-enabled tablet based. There is no need for custom hardware to be installed on a vehicle, and no need for mobile workers to carry a costly, bulky and slow laptop.

The system is platform agnostic in that the system works on GPS-enables cell phone such as: BlackBerry™, Android™ (Apple, Microsoft on roadmap), and iPhone™ and iPad™.

The system is carrier agnostic and works on any telecom carrier (e.g. AT&T, Verizon, T-Mobile, Sprint, VodaFone).

The system is customizable by the Sys Op for any particular business or service. The system uses XML based APIs to interface with 3rd party software.

Smart Device Integration Features

The system and method exploits the software and hardware capabilities provided by the GPS-enabled smart electronic devices linked into the telecom system. The integrated features include: Navigation system including audio driving directions; Signature capture; Image capture; Audio capture; Video capture; Location capture; 1D and 2D (QR codes) bar codes capture; and Payment capture (including NFC when available) (near field communication payment systems).

Examples of these uses of the system are: (A) Delivery Service: Worker uses the system to view his next appointment, clicks on navigation for directions, arrives at the delivery point (location is tracked), scans a 2D code, captures customer signature. (B) Sales: Worker views list of customers/prospects to visit, upon arrival receives custom action checklist, allow customer to use QR code coupon, captures payment and signature. (C) Account Manager: Worker arrives at customer site, updates system database with latest info, adds audio trip report and photo, records video of customer testimonial.

The system and method provides Location Tracking and Movement Analysis.

Component Features such as (i) Advanced location tracking and reporting with multiple operating modes (continuous, business hours, points of interests) for privacy control and/or battery optimization. (ii) Automated movement intelligence including time on site and location-to-point-of-interest matching for idle segments. (iii) Privacy and access control framework to respect and guarantee the privacy of your employees. Integration with System rules engine to enable location & movement triggered actions.

Examples of these uses of the system are: (A) Mobile worker enters or leaves an area which triggers a 'geofencing' activity such as a billing timestamp, or an email alert to a customer when within 5 miles. (B) Mobile worker is leaving appointment, the system triggers a custom "System form" for worker to complete (e.g. appointment report). (C) Automatically track the amount of time spent at each customer by workers and deliver a report to management analyzing face time. (D) Automatically generate an alarm if a device/vehicle is moving at night, if an advertising truck is idle or outside the area it is supposed to be in. (E) Help to retrieve a lost device based on current or last known location. The geo-location tracking and the correspondence with the task situs and the time-on-site factor can all be integrated into a accounting and billing system which is useful to the system operator, manager and customer. In this manner, the system can be configured to send a message at the completion of the task to the manager and the customer. This proof of service feature is beneficial.

The system and method provides Workflow Automation enabled to provide: (i) A rules based framework based on triggers, filters and actions to customize the Sys Op solution to its business needs. (ii) Wireless forms framework. (iii) Notifications and Reminders framework. (iv) Extensive customization support.

Workflow Automation functions include: (A) An "Office" alert and display configured to create a custom form to be displayed on the smart device every Friday at 2:00 PM (time and day trigger) to enable input of a weekly status report. (B) The system can display a form or checklist when a worker arrives at an appointment. (C) Set a rule for a coordinator/worker/manager to be notified by email or text whenever a mobile worker is going to be late for an appointment. (D) Create a set of rules to detect abnormal conditions such as a vehicle moving at night or outside of a given area, or if a user is idle more than a certain amount of time (e.g. advertising truck).

The system and method provides Activity Scheduling, Tracking and Reporting to provide: (A) Drag and drop scheduling of appointments, work orders & task lists, with real times updates to workers. (B) Planned versus actual visualization and metrics, with the actual automatically created by this system component.

The system and method provides Mobile Planning by creating optimized route to save on fuel costs and limiting delays by finding the most efficient path in terms of mileage and traffic conditions.

The system and method provides privacy and access control framework for the task person.

A mobile worker's (task person's) schedule is updated during the day with a new and an optimized plan of activities, thereby eliminating paper plans and permitting the Sys Op to reduce paper and ink usage and achieve environmental goals.

The system and method provides Activity and Expense reports which can be validated by system audit trails. For example, a manager can receive a report every morning with activity details for entire mobile team: % late, % on site, which customers had access to the task person, face time with customers, and number of customer visits. A consulting services company can automatically track distance and time allocations of all their mobile workers to customers for billing purposes.

The system and method provides a Customer Self Service Portal with the following features. (A) A configurable and customizable web based portal which can be branded as needed by system clients. (B) A 24/7 real time view of work orders, with the ability to update or create new ones. (C) Visibility by customer into worker movement and arrivals. (d) An IVR phone based voice presentation to the customer portal. (D) Notifications via SMS (short message service) or email based on workflow rules. (E) Customer satisfaction monitoring via automated surveys.

The Sys Op decides to enable their customers to view location and estimated arrival time of visiting service worker by logging in to a secure web page, or to request to be notified when the mobile worker is within X predetermined miles of their location. The Sys Op Customer can provide quality related feedback via an online survey in the portal or by email. The Customer is able to order additional services via access to live work orders. This "add services/goods" feature permits the Sys OP, upon the real time request of its customer, to provide additional goods or services to the customer or enable cross selling of goods and services to the customer without requiring live human resource.

The system and method provides a Real Time and Secure Information Exchange with the following features: (A) Optimized for smartphone and limited bandwidth environments. (B) Caching mechanism to enable access to critical data even when the device is out of range. (C) Open set of APIs to enable extension of 3rd party applications such as ERP/CRM to the mobile world. (D) Mobile workers have immediate and real time access to the latest customer information, products, and inventory. (D) Customer profiles can be automatically relayed to the worker's handheld prior to arrival, resulting in a prepared worker and a superior service engagement (or first call resolution rate, or sales close). (E) Mobile workers can remotely update the customer profile, capture critical data from the field, perform form based reporting, execute payment/billing transactions, and any other high-value activity that system has enabled for a smart device.

The system and method provides a wide range of settings for the Sys Op as follows: (A) Global Settings—define the settings that apply to all the users of the company (SMS, customer portal). (B) Payment Options—configure the payment options for work orders (Retainer, Credit Card, PayPal). (C) Rule-based operations—configure system operation. (D) Work Orders ("WOs")-configure work orders (the forms that are attached to a work order, the custom print view). (E) Customers—configure customers (the forms that are attached to a customer, the custom print view). (F) Forms Presentation and Data Input—configure Sys Op forms as data input and output templates. (G) Tasks—configure tasks (categories). (H) Activity—configure the custom activity types. (I) Quick Launch Settings—configure links that appear in the "Quick Launch" panel. (J) User Permissions Templates—configure the user permissions templates that can be assigned to users.

Time-On-Site

The System Time-On-Site module is an automated tracking & reporting solution for organizations that need to analyze the amount of time their workers spend on site, but without infringing on their personal privacy.

The System Time-On-Site tracks the amount of time each worker spends at predetermined locations such as customer or project sites without tracking their personal or professional whereabouts and activities in between. If the Sys Op is interested in tracking and visualizing all movements and locations, the general system operations described above enables that feature.

System Time-On-Site provides automated and concise reports that are sent by email daily and weekly (time, day of the week, date, date range, frequency, destination are all fully customizable). In addition, the reports can be generated for any given time frame or combination of users via the web interface.

System Time-On-Site is a solution that provides key visibility and insight (e.g. which customer was visited and for how long, how long ago was that specific customer location visited and by whom?) while simplifying the day-to-day tasks of the Sys Op mobile workforce (automated activity report, expense report documentation and validation) as well as giving the task person or mobile worker the peace of mind that their privacy rights are secure and respected.

A summary of the Time-On-Site module follows. The GPS enabled smart phone or computer tablet or GPS enabled electronic device, with a telecom link, is carried by the mobile worker. The GPS enabled smart device contains a System Time-On-Site native application that captures the locations of the user-task person and securely communicates that geo location, time and date data to the system's web based servers. On the server side, the Time-On-Site module analyses those locations and computes actual movement versus idle segments. For each idle segment, System Time-On-Site searches from the list of predefined points of interest (for example, customer or partners address or a geographic area defined by a center point and a radius or predefined spatial region about the center point to find a match. If there is a match, the corresponding idle segment is saved and it will be used as part of the reporting. Otherwise, it is discarded.

Office Coordinators and Management automatically receive a daily and weekly summary report by email. These authorized Sys Op persons can also log in to their web portal for real-time access to the geo tracking information or to generate the report for a given time frame and user(s) and Geo-enabled devices.

Additional features of the Time-on-site module include: (i) Associate actions (email, forms to be filled out) whenever the mobile worker enters or leaves a location. (ii) Capture and visualize the entire path of the mobile worker (e.g. to automate and securely generate expense reports). (iii) Capture critical information from the field (payment, signature, audio, images). (iv) Use the system APIs to automatically provision and maintain the Sys Op list of relevant addresses. (v) Add automated surveys to ensure quality of service and get customer feedback.

Details of the General System

FIG. 1 diagrammatically illustrates a system diagram of the present invention. It should be noted that the method and computer system can be located on a singular server controlled and operated by single Sys Op, or, in the alternative, the method and system can be distributed over a plurality of computer systems and networks. FIG. 1 diagrammatically illustrates both a centralized operation of the method as well as a distributed operation of the method.

FIG. 1 shows a task person T-person 6 at location TP-6a. Task person 6 has a smartphone 7 which communicates via a cellular telecommunications network to telecom network A. Telecom network A is connected to internet 10 which in turn is coupled to a plurality of computer systems. Sometimes, the Internet is referred to at a telecom network. The general operations of these computer systems are known to persons of ordinary skills in the art. Only major system modules associated with the inventive system and method are discussed herein.

Task person T-person 8 is located at location TP-8*a*. Task person 8 carries with him or her a computer tablet 9 that has telecommunications link to Telecom Network A or Telecom Network B. Both smartphones 7 and computer tablet 9 and other GPS-enabled devices use a satellite supported global positioning signal (GPS) which is detected by devices 7, 9. The GPS signal is utilized by smartphone 7 and computer tablet 9 to mark its location and provide information to persons 6, 8.

These task persons may be required to visit equipment store 12 at location ST-a prior to visiting customer A at location A-1, customer B at location B-1 or any other customers. Customer A at location A-1 has a telephone 14 which is diagrammatically illustrated as being connected to the telecommunications network which includes Internet 10. Customer A also includes a computer 16 which is linked to a telecommunications network and ultimately to Internet 10. Telecom network A and telecom network B are either integral with Internet network 10 or can be effectively considered an extension of Internet 10 utilizing common telecommunications system such as land line, satellite and cellular telephone communications systems. Customer B has a service location at location B-1 but currently customer B is located in office building 18. Customer B carries with him smartphone 19. Office building 18 is at location B-2 which is distant from customer B location B-1. Therefore, when customer B who is carrying smartphone 19 needs to visit the service person or sales person at location B-1, the cell phone 19 of customer B should be utilized to arrange and coordinate the simultaneous visit of task person 6, 8 at location B-1 with customer B at location B-1. As discussed later, this coordination of both the service person or task person and customer B at distant location B-1 is accomplished.

Internet 10 or telecommunications network 10 is connected to System Operator I server 20. Server 20 includes a computer processor 22 and a memory system 24 and various input/output devices 26. These devices cooperate and permit Server I of System Operator I to communicate with database 128. Additionally, System Operator I server 20 utilizes telecommunications input/output module 30 to communicate with smartphones 7, 19 and tablet computer 9 as well as customer A computer 16 via Internet 10, telecommunications networks A and B. System Operator server I is further connected to a network 28 linking the server I to an administrator computer 30, a manager A computer 32, a manager B computer 34 and various task team members 36. Task team members 36 have team member smartphone TT-A and smartphone TT-B. Manager A also has his or her cell phone 31 and manager B has her cell phone 33. As described later in conjunction with the Tables 2A to 2K and Tables 3A to 3R, System Operator I server 20 can fully engage all the features of the present invention.

However, there is a distinct benefit in utilizing the present method and the computer system in a distributed manner such as a software as a service (SAAS). In this distributed computer system and method, the present invention utilizes a trusted third party (TTP) server system 38. TTP server 38 includes all the elements customarily found in computer systems including interactive voice response (IVR) module 40 and telecommunications input and output module 42. TTP server 38 interacts with a plurality of databases effectively isolating sensitive data from System Operator I in database system I-44 from the data from System Operator II and database II-46. Customer data of the trusted third party System Operator 38 is stored in TTP customer database 48. Of course, a singular database may be utilized and different portions of that database would hold the secure or secret information for System Operator I as compared with System Operator II and as further compared with TTP customer database 48.

Internet and telecommunications network 10 is also connected to System Operator III server 50. System Operator IV server 52 is further connected to the telecommunications network 10. System Operator IV has access to database system IV-54. System Operator IV utilizes its own telecom input and output 56 which generates satellite communications links to task person 4 who retains smartphone 5.

FIGS. 2A to 2K diagrammatically illustrate a number of tables having field identifiers which are useful for carrying out the basic elements of the present invention. In "activities today" table in FIG. 2A has data fields for the title of the activity, the user who is viewing the activity, the time of the activity as well as the work order (WO) task, customer in action. All these tables can be reconfigured to closely match the business of the System Operator.

The abbreviations used in the Tables and in FIG. 1 are sometimes identified in the Abbreviations Table at the end of this patent specification. Otherwise, abbreviations are identified in the description of the invention.

FIG. 2B shows a Customer's Table which includes name, address, primary contact at the customer location as well as action associated with the customer.

FIG. 2C is a work order WO Table which identifies: the type of file operative for the open work order, the customer, the customer location, the status of the work order, a date and time for the projected delivery of goods or services at the customer location, the task person, and a field for confirming whether the task person recognizes (ACK) the assignment or not and an action field.

FIG. 2D is a list of equipment necessary to provide the goods or services at the customer location.

FIG. 2E provides an outline for the work order reports. These reports are generated both prior to the work being delivered at the customer location and also while the task person is at the customer location. Identification of a function ("FNC") is also shown in the Table. For example, under the "create report" header, the function (fnc) is YES which, when activated from the user on the smartphone or the web based interface portal provided by the system operator, the user (task person) can select YES generate the report and the system will generate an electronic fix copy of the report. In the absence of selecting YES, the system does not create the report. Hence, the create report has a function as identified in the table.

It should be noted that many, if not all, of these Tables are fully reproducible on smartphones carried by the user or task person.

FIG. 2F is a short form balance sheet for a particular customer. FIG. 2 G is a "task table" that identifies: the file type, the identification number of the particular task, the status of the task (pending, closed, open), the category of the task, a task description, a "data action required" filed, and a "status" field.

FIG. 2H is a "user table" (a task person table) with a login identifier name, a status and an action required field.

FIG. 2I list a "partner" table. Partners are well established customers or suppliers. FIG. 2J is a table for "devices." Typically, "devices" listed in the Tables are the GPS-enabled electronic devices, cellphones, smartphones, computer tablets and other GPS-enabled devices, all of which include a telecommunications link.

FIG. 2K is a listing of the products.

FIGS. 3A-3R diagrammatically illustrate another group of tables which are partially complete and which represent a working embodiment of the present invention. FIGS. 3A-3R provide examples of the system. The system can be configured in various manners and the tables can be expanded or contracted to adapt to any particular business. However, FIGS. 3A to 3R represent at least one working embodiment.

FIG. 3A is a configured table showing the initial screen presented to the user who is logged in to the system. That screen includes four different sections a "new notifications" section, a "new-unassigned work order" section, an "assigned work order" section and an "activities today" section. This initial presentation can be altered by the user under his or her settings function. Under "new notifications," the fields for the database or spreadsheet (a two dimensional database) include type, Id for the notification, date, description, a function enabling the user to view the entire alarm or notification record, a function to enable the user to accept the notification and another function to permit the operator to delete the notification record. The user may select to various functions and this is noted in these tables as "u-sel." Therefore, a notification is set for an "alarm" with a notification id record "123" and is set for date "Oct. 10, 2011." The event is a potential low battery on a particular GPS-enabled device. The user can view the entire record by selecting V (view), can accept the notification (ACC or ACK), or can delete the notification (del).

The "new-unassigned work orders" table is typically presented to managers of the System Operator. The identification and the title of the work order is provided in the far left column. The customer and a customer location listed in the next column. The status of the unassigned work order is open, pending or closed. Dates and actions are noted in the Table.

For "assigned work orders," again, the title and id of the work force is provided, the customer, status, date and task person assigned to the WO is listed. Preferably, the phone number of the task person is also provided. This data is part of the task person data collection maintained in one or more of the databases 28, 44, 46, 54 in FIG. 1. As an example of a particular layout, the user is presented with certain functions external to the table identified as "X-Table fnc" or "XT-fnc"). Therefore, with respect to new and unassigned work orders, the user can select "go to page 2" of the unassigned work order, "go to page 3," etc. With respect to assigned work orders, the external table function is abbreviated "XT-fnc." The "Activities today" Table is self explanatory.

If the user or System Operator selects a particular notification from the initial screen, a table such as FIG. 3B is generated by the processor server 20 or 38. It is well known that computer systems and, in particular, web based computer systems utilize servers to provide a data display screen which enables the user at computer tablet 9, smartphone 7 and computer 16 to respond and input data and manipulate data presented by the server. FIG. 3B shows a configured table for new and old notification. The type of notification and id of the notification is indicated as "alarm 123." This is the same "alarm 123" as identified in FIG. 3A. Therefore, FIG. 3B shows all the data collection or data record for that notification 123. The notification includes a message, the date the message was acknowledged (ACK), who acknowledged the message, a criticality indicator or alarm, a status of the notification, the creation date of the notification record, the date the notification was adequately responded to (closed date) and who closed the date. With respect to "status," the data may reflect and acknowledgment ack, a pending indicator or a field to delete or indicate NO.

FIG. 3C is a configured table which the user sees once he or she selects the assigned work order WO from the main menu of FIG. 3A.

With respect to FIGS. 3C to 3J, the same menu functions are provided along the top row of the screen enabling the user to select a folder or directory under: summary, equipment records, note records, documents, forms, activities, bills and history. These directories or file selections are underlined in FIG. 3C-3J. The folder which is underlined and shown in bold has been activated in the particular figure. Therefore, FIG. 3C is a summary of the assigned work orders ("summary" shown in bold print), FIG. 3D is the "equipment associated" with a particular record, FIG. 3E are "notes" assigned to a work order, FIG. 3F are "documents" available for that particular work order. FIG. 3G is "forms" associated with either the equipment or the service to be provided to the customer for that work order. FIG. 3H is an "activity log" for the work order. FIG. 3I shows the bills or accounting for a particular work order and FIG. 3J shows the history of that work order.

Returning to FIG. 3C, the "summary" of the work order includes fields for status, date created, customer, location, the task assigned person, the projected appointment data, an estimate of the duration of the service (tine on site) regarding how long the service person or sale person will be at the customer location. A confirmed status field as well as various functional inputs are provided. These functional inputs include the ability of the user who is viewing the FIG. 3C "work order summary" to "input" data, "see more data" on a particular field, "mark as critical" certain fields and aspects and data in that table, "acknowledge" that the work was done and "input more" data.

FIG. 3C also lists the travel time and the time-on-site which is calculated and stored as discussed later herein.

FIG. 3D is an equipment table associated with the work order. The equipment table can be changed to reflect any particular information necessary about the equipment.

FIG. 3E is a "note" associated with a particular work order. In FIG. 3E, the user can pull down a list of personnel such as the task person, the manager, the system operator, administrator. That selected person can then annotate the Notes record for the work order WO. Therefore, the task person and anyone associated with that work order, such as task team 36 or manager A32 or manager B34 or administrator 30 can annotate the "note" record associated with a particular work order.

FIG. 3F are the "documents available" and FIG. 3G are "forms available" to the person. FIG. 3H shows an activity log for a particular work order.

FIG. 3I shows a billing table for a particular work order. FIG. 3J shows an accounting history for that customer.

It is important to realize that task person 6 carrying smartphone 7 or task person 8 carrying computer tablet 9 can access this information in Tables 3A-3R both prior to beginning the drive to equipment store 12, to customer location A-1 or to customer location B-1. In this manner, the information stored in all these tables is transparent to the entire management team.

FIG. 3K shows a main menu listing four top level selections. In other words, the user, when viewing the main menu, can select home, customer, work orders, task, activity, account or help. Sub-file or folders are available under the "work orders" folder which include work orders, equipments and reports. Under the "reports" sub-folders, is a series of secondary sub-folders or sub-subfolders which include work orders, and balance sheets. Under "task," the sub-folders are task and reports. Under "activity," the sub-folders are schedule, notification (with sub-folders notifications, messages and alarms), locations (with sub-subfolders last known, task person time sheet, task person geographic path) and reports (sub-subfolders activity report). The account main folder includes sub-folders for user, partners, devices, products, setting, my settings, and administration. Many of these tables and data input screen are discussed earlier in connection with FIGS. 2A to 2K and 3A to 3R.

FIG. 3L shows a configured table for activity and schedule. The functions presented to the user include an option to select the daily time schedule for task person A, task B and task person C. Alternatively, the user can select a monthly calendar display. Additionally, the user may select all tasks assigned to a particular user or select "all users" by group name or select a user by smartphone or device. As stated earlier, the device is a listing of all the Internet and GPS-enabled devices carried by all task persons and managers administrators. Alternatively, the user can select the geographic device or group of geographic devices.

Under "display daily calendar" function, FIG. 3L has a vertical time blocks 8 AM, 8:30 AM and 9:00 AM extending down through the evening hours. The rows are identified by the Task Person A, B and C. If the user selects smartphone, the smartphone ids would be atop the column headers.

FIG. 3M is an "activity notification" Table which again shows a daily calendar identified by column headers for task person A, B and C. The user can select a single user in a monthly calendar display or all users in a daily calendar display as well as smartphone device or geographic or GPS-enabled device.

FIG. 3N is a last known location which displays a map with location points showing the last known location of a particular task person. The user can select smartphone in a group, or singular user with a smartphone as well as a GPS-enabled device or a group of GPS-enabled devices.

FIG. 3O is a location time sheet tracker. A display daily calendar shows task person A or task person smartphone or task person computer tablet with data filled in the row associated with a time block. Therefore, at 8:00 AM, task person A has data in their time block extending to 9:00 AM. Compared this data with the computer tablet listing only an 8:30 data entry. The user is permitted to select various users, groups or task persons or GPS-enabled devices.

FIG. 3P is a location and geographic tracker. This enables the user to select a task person, smartphone device, or various groups of devices. A map is displayed to the user and under the map is a critical marker Table identifying the critical nature of the task being reviewed. Further, a status of the GPS-enabled device is shown. The status is idle, moving, or out of range. A total time of travel as well as a total of time on site is provided in this table.

The table beneath the geo tracking map also shows the start time as well as the time on site. An approximate distance to the customer location A-1 or B-1 is provided in this table.

FIG. 3Q discloses an activity Id, a user, customer and enables the user to input display or select calendar.

FIG. 3R discloses an "account" Table showing a sub-account for all users, partners, devices, products etc.

Details of the Realtime Customer Access System and Method

The present invention is a method, system and a computer program that provides the customer with realtime access to the geographical location and estimated time of arrival of a mobile worker, that is, a task person assigned to a unique task. As described earlier, these mobile workers and task persons carry with them a GPS-enabled phone, a computer tablet or electronic device which is called herein the assigned GPS-enabled device, such that the system operator can detect, in a general sense, the location of the task person or mobile worker throughout the business day. The invention further relates to a system and method that provides the customer with various communications channels to access that task related data and be notified of changes in the posted time of arrival.

Figure 5:
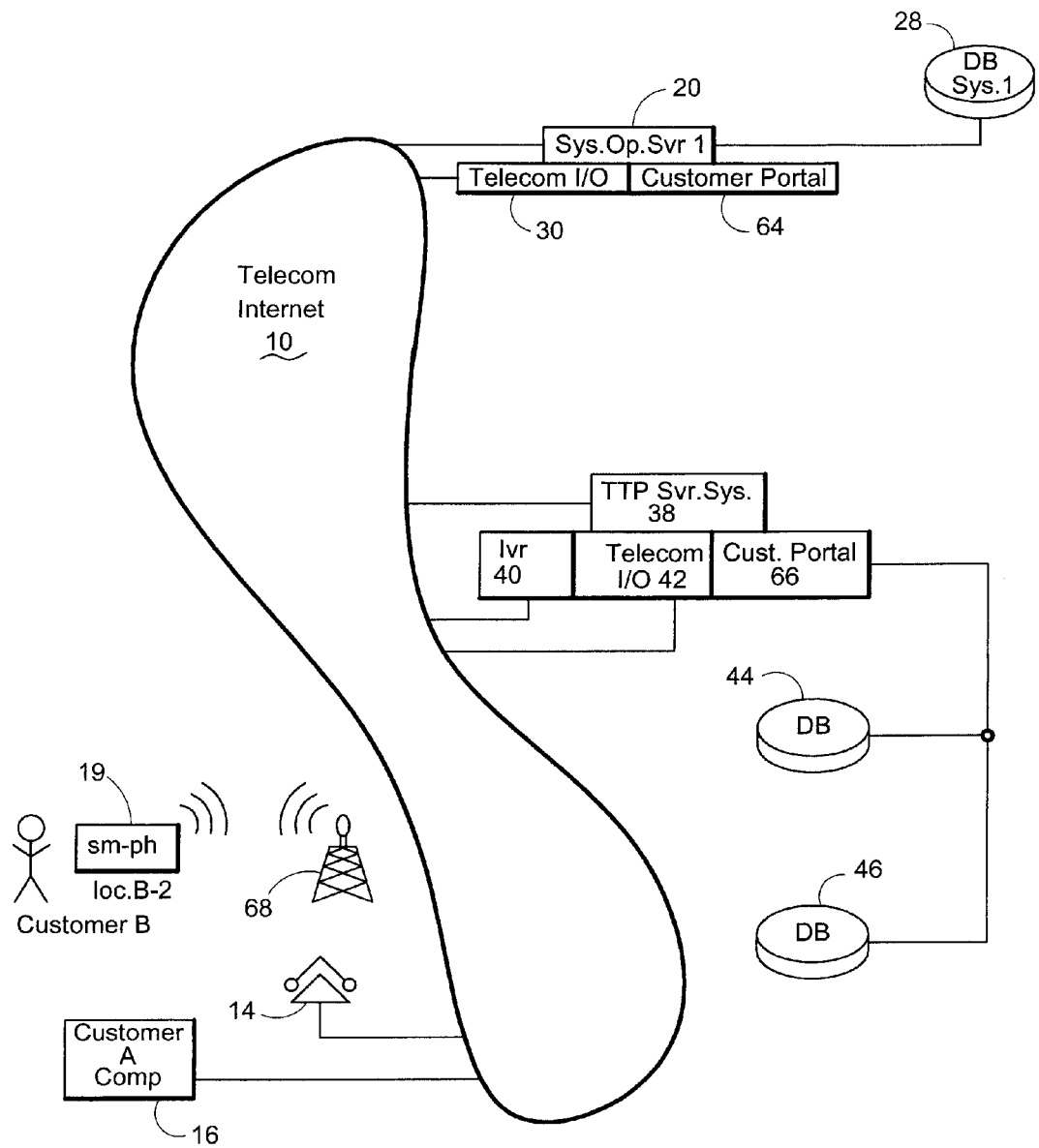
FIG. 5 diagrammatically illustrates a portion of the system diagram, expanding on the system diagram of FIG. 1, showing the interface communications module enabling the customer access portal.
Figure 6:
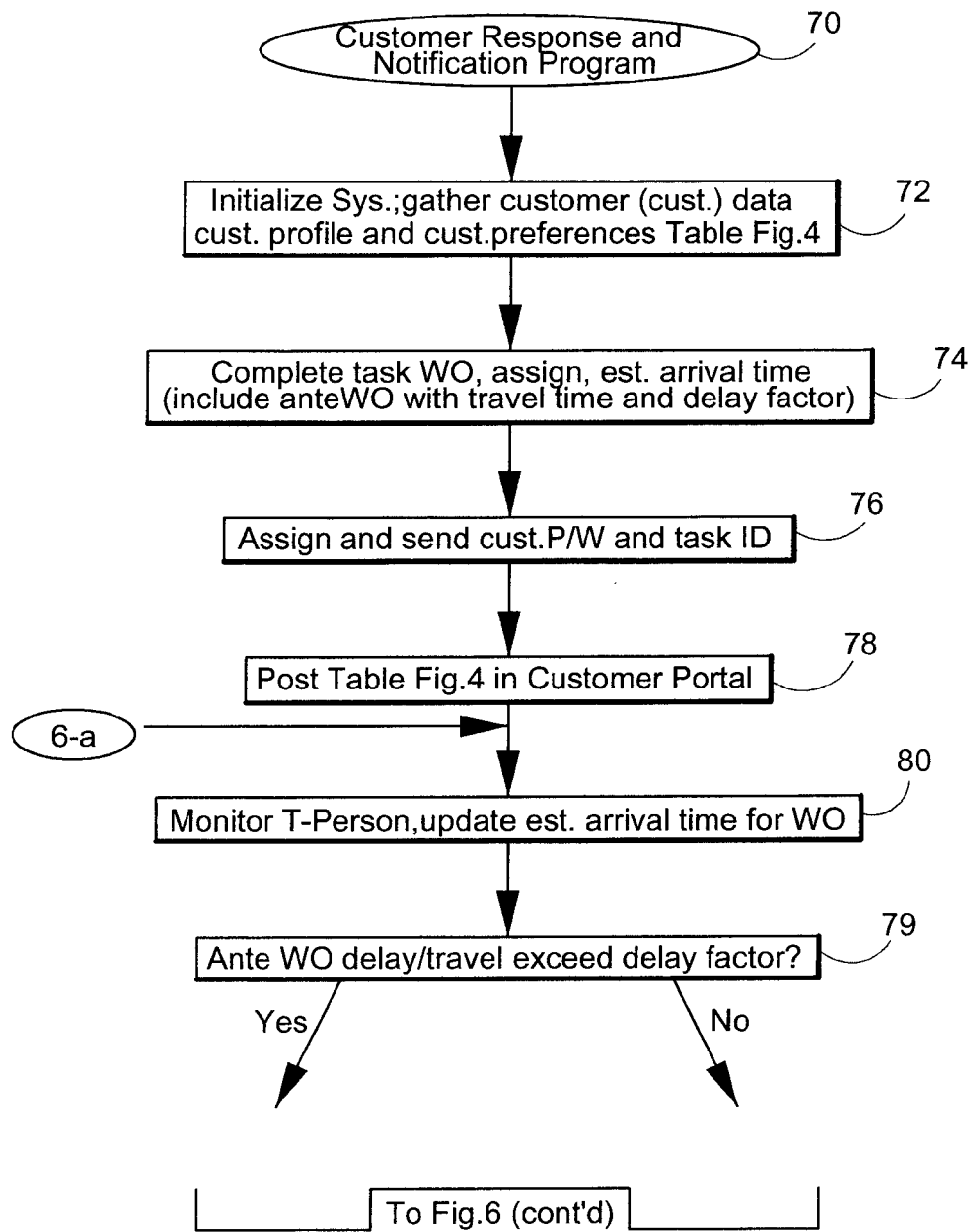
FIG. 6 diagrammatically illustrates a flowchart for the customer response and notification program.
Figure 7:
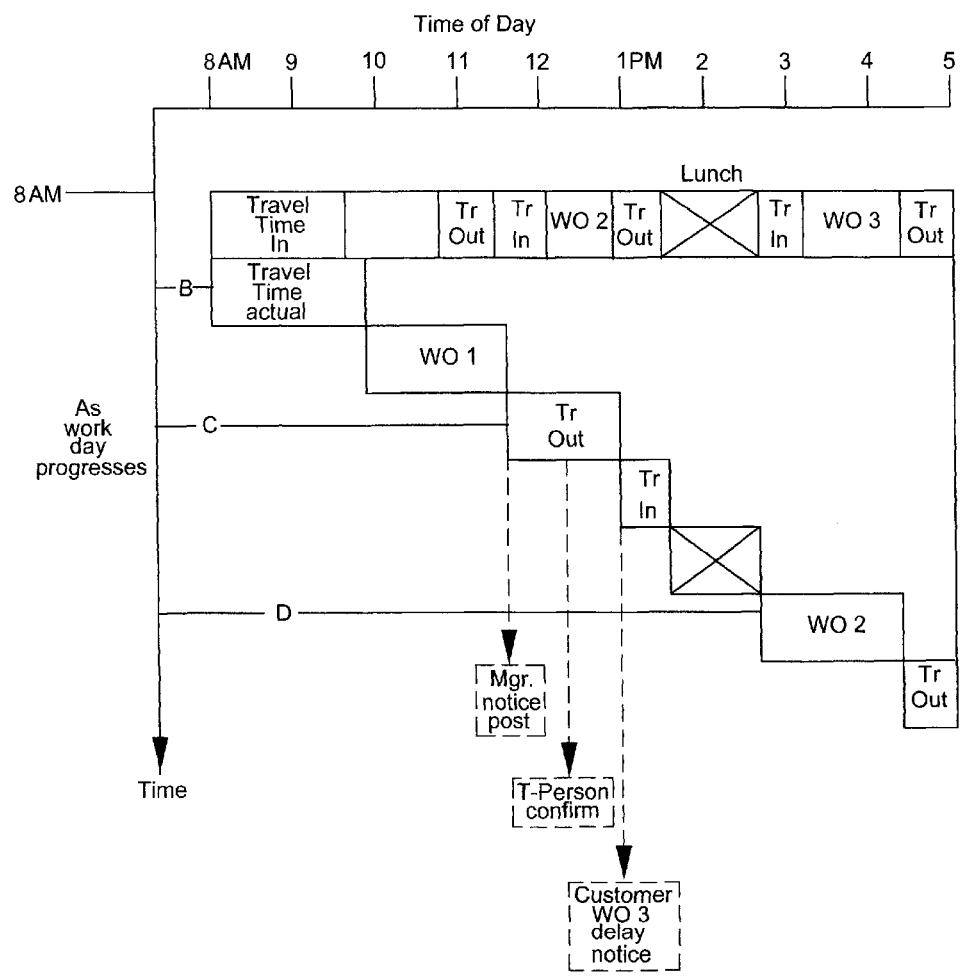
FIG. 7 diagrammatically illustrates one example of a delay notification system.

The real time customer access program, system and method can use tables or databases which may be configured as shown in FIGS. 3Ca, 3Ea and 4. FIGS. 5-7 show additional details of the system. Although FIG. 3C, 3E are discussed earlier, the modified table FIG. 3Ca is the assigned work order WO main menu table. This Table 3Ca has added information indicating whether customer alerts have been enabled by the Sys. Op. for the customer. The customer alerts row indicates to the system operator whether the customer has selected (turned ON) a call ahead or an antecedent notice of arrival message. In the illustrated embodiment, if a customer has elected and selected to receive an antecedent message prior to the arrival of the task person, the table is annotated YES. As discussed later, the initial input into the customer alert field may be by an intake person at the system operator location, when the customer has called in a service request, or otherwise. In a more sophisticated system, the customer may access a customer portal 64, 66 as discussed briefly in connection with FIG. 1 and discussed in more detail in connection with FIG. 5 herein. In this customer initiated situation, the customer determines if he or she wants a call ahead or an antecedent notice of arrival message. Further, the customer can change whether or not to receive the antecedent message by selecting YES or NO. In the customer alerts row, Table 3Ca, YES at estimated arrival indicates that the customer portal 64, 66 (FIG. 5) is active. YES at the call ahead field means the antecedent message module is activated. The same is true regarding the delay field.

The customer alert row shows the estimated arrival and the system operator can turn ON or OFF the customer portal to show the estimated of arrival (or not) and show other data, such as the estimated time on site. Sometimes the portal displays a map and/or time-distance data from mobile worker to task situs. The customer alert row in FIG. 3Ca indicates whether the customer has selected a call ahead or antecedent notice of arrival message. The table also shows whether the customer should receive a delay notification. Under the function column, the system operator can view the items and any customer notes supplied and input into the system by the customer.

Other functions may be provided as noted earlier in FIG. 3C, work order main menu table.

FIG. 3Ea is a modified assigned work order, notes table. In this revision of table 3E, the customer has supplied two notes, the first note indicating that water has leaked all over the floor. The Table identifies the message date and time. The Table also enables this person viewing the table to select his or her authorization through a pull down list. Certain notes will be blinded or blocked to certain users of Notes Table 3Ea. The system operator has access to all the information. The manager has a high level of access to the information but the task person may have only limited information. The customer may have more limited information. This is indicated by the YES/NO indicator in the column "visible by customer." The Sys Op can switch the YES or NO as needed. Functions of view, acknowledge and listen (for the audio note sent by the customer) are available in the functions column.

FIG. 4 is an example of a Customer Notification Table which enables the system and the method to organize the information. In this table, the customer location or task situs is identified, as is the task id, and this may include a description of the task. In general, the table is viewed by a customer. The table has information shown in brackets which are not visible to the customer. For example, under the column "estimated arrival time," the system operator can turn ON or OFF the display of the estimated time of arrival such that the customer portal will not display the arrival time. The table will display customer location and task id. In that same "arrival" column, the user or customer has the option of establishing an arrival notice (Y/N) and selecting one of several communications channels. The communications channel may be a home phone (a first or primary comm.channel), an office phone (a secondary comm.channel), a cell phone (a third comm.channel) as well as an email (a fourth channel). In the illustrated embodiment, the customer selects only one of the home phone, office phone, cell phone (voice) or cell phone (text message or msn short message service). This is the primary selection. The customer can also select an email which, when opened, will show the estimated time of arrival indication. The customer selects YES or NO. The "second contact" row relates to a second comm channel contact. For example, in connection with an husband and wife customer, the husband may be the primary contact and the wife may be the secondary contact. The second contact would include the same type of data shown for the primary contact. Also, rather than having the labels "home phone" and "office phone" be placed on the table, the actual phone numbers will be placed in the table by either the system operator or the customer. The table is populated by the Sys. Op. or the customer. With respect to the fourth column, estimated time on site, the system operator can turn ON or OFF that data view by the customer (a blinded data field). The estimated time of arrival data is associated with the call ahead time. Herein, the call ahead time is sometimes identified as an antecedent notice of arrival message or simply an "antecedent message." The notice of arrival is a projected notice of arrival time and the customer may want to be notified 30 minutes, 60 min, or 90 min prior to the projected time of arrival of the task person assigned to the task. If the customer is not at the task situs, if the system gives a reasonable time when the task person would arrive at the customer location, the customer can be prepared and be at the situs location at the appointment time. In the illustrated system, the customer selects either 30 min call ahead time or antecedent message or a 60 min antecedent message time. Only one selection is permitted. Of course, different systems may enable the customer to input a specific time or multiple call ahead times 30 min, 60 min, 90 min, 2 hrs may be selectable from a pull down menu. Direct data input by the customer or sys. op. is also possible.

The last column "estimated bill" and "assigned time person" may be helpful to the consumer. The system operator may turn the customer view of this data ON or OFF. Further, this last column indicates that a delay notice is to be set to the customer in the event the task person is delayed from the projected time of arrival. The system operator may turn ON or OFF the delay notice. The system can be established such that the delay notice trigger is automatically sent 60 min prior to the projected time of arrival and upon the trigger, the system re-calculates the "time of arrival." If the re-calculated time is t/−10 min, message may be sent. Of course, the system operator may change that pre-set time. Again, the customer (or sys. op. at initialization) may select one of several communications channels as well as one of several modes of communication. One mode of communication is a text message (sms) and another mode is a voice message. Emails can also be supplemental modes of communications. In addition to email, a calendar alert may be sent to the customer. The calendar alert could be the antecedent message or it may be a delay message.

With respect to the "add notes" row, notes for a particular customer may be included in the "data here" field. As indicated in FIG. 4, the customer may type in or send in notes to be logged into that field. And the next column, the system acknowledges the note, sends the note to the manager and sends the note to the task person (T-P). Functions are established to identify the degree of criticality and whether or not the customer should be called back. Other functions such as write, delete, save and review or provided. The last row "add audio note" enables the customer to leave a voice mail message which is stored in the system. The system determines and the sys. op. sets the enable audio message ON or OFF. The system also sends a note to the particular task person manager, system operator when the customer uploads an audio or voice message into the system. In the next field, the manager or task person acknowledges.

As discussed above, FIG. 1 describes a system wherein a task person 6 is assigned a task by process server I 20 and is appropriately notified of the task. The task person is at location TP-6*a* and must visit a customer at customer location A-1 or subsequently at location B-1 or B-2. The system described above in connection with FIG. 1 notes that the task person has a GPS-enabled cell phone with an ap (an access point) and may have a cell phone that is internet enabled. Computer tablets and other electronic devices may be configured in this manner. The ap (an access point) or internet portal permits the task person to access the work order and the customer table FIG. 4. The GPS in the system computer tracks the location of the task person TP 6 as the task person makes his or her way to customer location A-1, B-1 or B-2.

In FIG. 5, the task person is assigned to visit customer A at location A-1. Customer A has a computer 16 at location A-1 and a telephone land line 14. Customer B at location B-2 has a smart phone 19 which is internet enabled such that customer B can access various items on process server I as well as TTP server system 38. Phone 19 may have an ap (an access point) access to Table 4 or internet access to the customer portal. Communications are enabled through the telecommunications network which extends to the internet. FIG. 5 supplements the system diagrammatically illustrated in FIG. 1. Therefore, process server I 20 is shown as having access to database 28. Process server I has coupled thereto a telecommunications input/output module 20 as well as a customer portal module 64. The TTP server system 38 is a trusted third party server system. The TTP server 38 includes an interactive voice response IVR module 40, a telecommunications input/output module 42 and a customer portal module 66. TTP server 38 is coupled to database 44 and database 46. In one embodiment, the system is operated by TTP server 38 which has a customer portal 66 enabling any customer, customer A or customer B, to have access to the customer table FIG. 4 in the database and possibly the notes table FIG. 3Ea. This access is typically provided by assigning to a particular customer: a customer user name or id as well as a customer password. The customer id and password enables secure data access. In this manner, only a singular customer can access customer portal 66. The customer portal 66 activates accordingly either the voice response IVR 40 to generate a voice message to customer A or customer B or, in the alternative, the telecommunications I/O 42 to generate an email message, text message or a calendar alert directed to customer A or customer B. If the customer does not have an internet enabled communications device, such as a smart phone 19, the customer may use a computer 16 or a land line 14. Of course, land line 14 would interact primarily with IVR 40. Customer 16 will interact primarily with telecom I/O 42 for digital communications or IVR 40 for voice.

In a distributed system, the TTP server 38 interacts with a supplemental computer and a supplemental database which, as an example, server I 20 and database 28 is the supplemental computer and the supplemental database. TTP server 38 includes a store and forward module which updates customer portal 64 as well as database 28 upon any change to the customer access data in database 44, 46. Server I may be configured such that the customer puts information directly into customer portal 64 and server I then updates the TTP server 38 and databases 44 and 46. Two-way update modules are available.

Access to the customer portals 64, 66 may be provided by an ap (an access point) on the customer smart phone or a web based process on customer computer 16 or internet enabled phone or device. In general, an ap (an access point) on smart phone 19 operates effectively in connection with a web based process server maintained by TTP server 38 or server I.

FIG. 6 shows an example of a customer response and notification program 70. In step 72, the system operator initializes the system. This entails assigning a task person to a task, completing a work order (described earlier), and assuring that a GPS-enabled device is assigned to the task work order. Further, the work order includes customer data such as name, address, phone number, as well as secondary phone numbers, at task situs. The customer profile is completed either by the customer or by an associate intake person at the system operator. The customer may complete the customer preferences table of FIG. 4 or an associate at the sys. op. may complete initially the customer preferences table. Once complete, the preferences table is posted as the customer portal. If the sys. op. has activated all the functions on customer portal table FIG. 4, the customer knows the task id or identification, the task description, the task person assigned to the task and an estimate of the bill. Additionally, the customer sees the projected time of arrival and the estimated time that the task person would remain on site to assist the customer. Further, the customer will see which communications channel the customer has selected as well as which communications mode is set ON. For example, the customer may select a cell phone and a voice message as the preferred communications channel and communications mode. Alternately, the customer may select the customer cell phone and a text message as the channel/mode. The customer can always select one as provided in the illustrated embodiment. As a supplemental message sender module, the customer may select email and as a further notification or a calendar alert may be provided by the system. Table 4 maybe modified for the calendar alert. Additionally, the customer can select the call ahead time or antecedent message time. The illustrated system selects 30 or 60 minutes. The customer selects the call ahead time to trigger an alert message prior to the estimated time of arrival. Additionally, in a full display mode, the customer selects when he or she wants to be notified of any delay in the projected arrival of the task person. Again, the customer may select either the primary communications channel, a secondary mode or a secondary communications channel and a primary, secondary or tertiary communications mode. The portal may also serve up to the customer device a geo map (FIG. 3N) with the Table 4 as adjunct data.

Steps 72, 74, 76 and 78 (post data) are explained above. Step 74 notes that the system completes the task work order, assignment, estimates the arrival time for the task person and includes an antecedent message. The system computes the travel time between location TP-6a and task situs A-1, B-1, B-2. A delay factor is included in the computation. The distance comparison data maybe computed or third party data gathering module, such as one with MapQuest™ or Google Maps may be used. Step 76 assigns and sends to the customer the customer identification and the customer password and the task id. All of this information is needed by the customer in order to access and open up the customer portal 64, 66. The task id identifies the unique task. The customer name and customer password is a common access protocol for any web based portal.

Optional notices may be provided to the customer such as when the task is assigned, the customer may be notified via a posting on the customer portal as to what task person is assigned to the task. Also, contact data for that task person may be provided to the customer.

In addition to the customer notices discussed above, the customer portal may include a module showing a map to the customer device via portal 64, 66. The portal may display distance data between the current location of the task person, as determined by the GPS-enabled device carried by the task person, as compared with task situs. Also the time of estimated arrival to the task situs is displayed. Further, in very sophisticated business systems, the antecedent work order and antecedent task situs may also be posted and viewable by the customer.

As for functions available to the customer, these functions may include a call ahead communications channel/mode, a call ahead antecedent time, delay notices activation, confirmation of appointment, cancellation of appointment, an email, all with a password linked to the customer portal. The task id and an IVR password and customer id is necessary to access the audio portion of the customer portal.

Common authentication routines may be employed to determine that the customer is, in reality, the customer represented by the data in the database. This authentication may include a confirmation of the telephone ANI as well as required customer input of the task number or work order number and a password or pin.

In step 80, the system monitors the location of the task person or mobile worker and updates the estimated arrival time for the work order posted in the customer portal. Step 79 notes that the antecedent task data for the work order determines whether a delay has been detected from the preceding WO task (the antecedent task) or if the travel time between the antecedent task and the task subject to the work order has exceeded a pre-set delay factor. If YES, step 81 notes that manager approval is required prior to the system generating a delay notification to the customer. See table FIG. 4. The manager may need to ACK the delay notice. Step 83 issues the customer delay notice to the selected communications/mode selection. Step 85 notes that the customer may cancel the appointment, confirm the delay or the system notes that no response has been submitted by the customer. Step 87 adjusts the records in the database 44, 46, 28 and this update of the database is subject to access by the customer portal 64, 66. From step 87, the system jumps to jump point 6-a to a point immediately preceding monitor task person step 80.

Returning to the decision step 79, if the task person has not been delayed at the antecedent WO location and if the travel time limit from the antecedent customer WO location to the targeted work order location has not been exceeded, the NO branch is taken to step 82. Step 82 determines whether the estimated time of arrival for a particular work order should be reduced or compressed. If YES, step 96 notifies the customer. In step 98, the customer approves, declines or does not respond to this early arrival notice from step 96. In step 110, the system adjusts the databases and the customer portal. The system then goes to jump step 6-a preceding monitor task person location step 80.

If the estimated time of arrival is within reasonable predetermined time parameters (set by the sys. op.), the system from step 82 takes the NO branch to step 84 which is the customer change notice table. In step 86, the system follows the protocol on the table. In other words, the customer is able to change the communications/mode protocol at any time until a certain preset time period immediately prior the estimated time of arrival. In other words, a customer at location B2 may want to be notified via email and an office phone when the customer B is stationed at office 18, but the customer may change the communications channel/mode to a cell phone 19 to be notified of the call ahead time or delay time when he or she leaves office 18. This occurs when customer B is traveling from location B-2 to location B-1. Step 84 recognizes that the customer may change the selection for the communications channel/mode until a predetermined time before the estimated time of arrival. In step 86, the system follows a protocol to generate (a) notices and (b) call ahead and (c) delay messages to the customer. In step 88, the system notes that the work order has been complete. This is permitted by the task person contacting the server 20, 38 and indicating to the system that the task is complete. An ap (an access point) to a work order table is preferred. In step 90, the system seeks a customer survey describing various customer responses. Customer relations management CRM programs utilize surveys in many situations. Step 92 posts as a note in the system the resulting customer survey. The module ends in step 94.

As discussed above, the system and particularly the processor servers 20, 38 include various modules, computer programs and hardware in order to generate the data and the notices and messages described earlier. For example, the server processor updates the time for arrival and replaces the posted time of arrival with the updated time of arrival based upon a calculation of the current task person location and the task situs A-1, B-1 or B-2. In alternate embodiments, a map may be displayed, a distance between the current location TP-6a and the task situs may be displayed and/or the estimated time the task person will arrive at the task situs may be displayed. In a simplified system, once the customer selects a communications channel and mode, and as a default, the system automatically sets the delay notice communications/mode to the same earlier setting. The computer system 20, 38 has various modules and mechanisms for communicating with customer A and customer B. See FIG. 5. The means for effecting a display typically includes customer portal 64, 66 and potentially telecommunications I/O 30, 42. If a voice message is selected by the customer in the customer table at FIG. 4, IVR module 40 is activated which generates data announcing audible signals at smart phone 19 and land line 14. The map generator is part of web server 20, 28 and is also part of the customer portal 64, 66.

A calculation system or means for obtaining a display distance between the mobile worker GPS and the task situs could either be a calculation program operated in the server processor 20, 38 or may be a "get data" process to access a third party supplier of that information. One such service supplier is Mapquest™. Further, processor 20, 38 may have a calculator for updating the time of arrival data. Once updated time of arrival data is calculated, the servers repost and re-write the time of arrival in customer portal 64, 66. The customer (as well as the task person or other registered user) may access the system via an ap (an access point) from a smart phone or via a voice telecommunications channel wherein the system employs an interactive voice response (IVR) module for the communication.

FIG. 7 diagrammatically illustrates one mechanism for updating time of arrival data. On the horizontal axis, a time of day from 8 am to 5 pm is diagrammatically noted. Along the vertical axis, a time of day "as the work day progresses" is noted. When the tasks are assigned to the mobile worker, tasks WO1, WO2 and WO3 are input into the system primarily under the approval of a manager. The first time of block from Sam to approximately 9:30 am, assumes that the task person must travel from the Sys. Op. business office to task situs WO1. The next time of block at about 11 am is the travel time (Tr) out of task situs WO1. The next block references the travel in time to task WO2. The travel time out time block near time 1 pm immediately precedes the lunch block which spans approximately to 2:30 pm. The travel time in at 3 pm precedes the time on site block for task WO3. The travel out near 5 pm notes that the mobile worker is traveling back to the Sys. Op. office or otherwise. However, as the work day progresses from initial point Sam to time-of-day B, the actual time traveled by the task worker extends near 10 am. Therefore, the task WO1 is extended or moved to approximately 11:30 am. The travel time out then extends to 1 pm and the travel time in extends to a lunch hour break. As you can see since the work day in progress has elongated the assigned tasks, the mobile worker will not be able to complete tertiary work order WO3. At about 2:30 pm, the mobile worker is on site for work order WO2. The mobile worker then travels out at or about 5 pm. At time C in the "work day progresses" timeline, the system sends a message to the manager indicating that the task worker has been delayed due to unexpected issues. At or about noon, the task person confirms with the manager that the delay has occurred. At or about 1 pm, the customer assigned to work order 3 is sent a delay notice. In this manner, the customer for work order 3 can confirm the new appointment at the next day, can cancel the appointment, or can do other actions. The communication interfaces which includes I/O 30, 42 IVR 40 and customer portals 64, 66 are both coupled to the respective servers 20, 38 and are enabled to send messages to the customer. The process server 20, 38 has a timing module as discussed in connection with FIG. 4 which generates the antecedent data indicating to a customer that the task person will arrive at a certain time. For example, an antecedent message for work order 2 may be generated by the system at 11 am, approximately 45 min. before the task person is to arrive at task situs for work order 2. In the event of a delay, the notice of arrival may be delayed to work order 2 at time D and the antecedent notice of arrival may be generated at 1:15 pm. This system uses a monitor to identify the current location of the task person and, more particularly, the location of the GPS enabled device carried by the task person.

Description of Typical System Features

The present invention relates to an enhanced mobile workforce planner and tracker deployed over GPS-enabled devices and enabling access to workforce data via computer systems, over the Internet and on a computer network (LAN or WAN), and computer programs, computer modules and information processing systems to accomplish these planning and tracking services.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| Admin | Administrator |
| ap | an access point |
| API | application program interface |
| ASP | application service provider - server on a network |
| bd | board |
| comm. | communications, typically telecommunications |
| comp | computer with Internet access |
| comp-tbl | computer tablet with GPS and telecom link |
| CPU | central processing unit |
| db | data base, may also refer to a spreadsheet (a two-dimensional database) |
| Disp | display or code |
| doc | document |
| dr | drive, e.g., computer hard drive |
| Equip | equipment |
| fnc | function such as V = View, ACC = Accept task; DEl = delete entry; ACK = acknowledge receipt of comm. |
| Geo | geographic location or data (geo.loc. is GPS data) |
| GPS | geo positioning system and location (optionally time data) |
| HR | human resources or regional manager |
| I/O | input/output |
| Int | Internet network (part of the telecom network) |
| loc | location |
| loc. ptr. | displayed location on a displayed map |
| mem | memory |
| Mess | message as in SMS or text message |
| mgr. | manager in the Sys Op administration |
| ntwk | network |
| pend | pending, such as a posted task, not yet completed |
| pgm | program |
| proc | processor, as in computer processor |
| Pty | party, as in Trusted 3rd Party ("TTP") |
| P/W | password |
| Rcd | database record or record profile |
| re | regarding or relating to |
| Reg'd | registered as in Reg'd Pro, Registered Provider |
| rel | release |
| req | request |
| rev | review |
| Rpt | Report |
| rt | real time, may include day and time stamp data |
| sec | security |
| Sel | select |
| sm-ph | smart cellphone with GPS |
| SR | sales representative |
| sys | system |
| Sys Op | System Operator |
| t | time, sometimes refers to day and date and time of day |
| T-person | task person who is assigned a task |
| Tbl | table, may be configured as a database or spreadsheet |
| telecom | telecommunications system or network |
| URL | Uniform Resource Locator, or other network locator |
| u-sel | User selects function |
| WO | work order |
| X-tbl | a selectable user function displayed beyond the grid line of the data table |

The claims appended hereto are meant to cover modifications and changes within the scope and spirit of the present invention.

What is claimed is:

1. A computer-based method providing real time task-related data to customers seeking services, goods or consultations at a customer task situs location from a task person assigned to a unique task and an assigned GPS-enabled phone, computer tablet or electronic device coupled to a telecommunications network, said customer having an Internet-enabled communications device linked to said telecommunications network for communications over said telecommunications network, the method operative with a database populated with a plurality of tasks represented by unique task data collections, customer data, task person data, assigned GPS-enabled device data and current location data, one of said unique task data collections having said task situs location data, projected time of arrival data, task identifier data, task description, and task assignment data, said task person data including contact data for the assigned task person and said GPS enabled device, said customer data including customer name, identifying data and a customer communications channel and mode, said database coupled to a web-based server and processor which in turn is coupled to said telecommunications network and enabled to communicate over said communications channels and modes per said customer data, the method comprising:

gathering, in substantially realtime, a task person location from said assigned GPS-enabled phone and determining said projected time of arrival substantially continually based thereon;

said server effecting a display on said customer Internet-enabled device listing: said task identifier or said task description, said projected time of arrival data and said current task person location data;

wherein, with respect to said customer data, said communications channel and mode is a primary communications channel and mode, said customer data further including a secondary communications channel and mode;

said server accepting customer-initiated selection of one said communications channel;

said server accepting customer-initiated selection of one communications mode from the group consisting of: a voice message through the selected communications channel to said customer, and a text message through the selected communications channel to said customer, said server accepting customer-initiated selection of a task-related communications channel and a task-related mode selection for a time period for an antecedent notice-of-arrival message, said antecedent message based upon said projected time of arrival for said task person at said task situs or distance to said task situs, and a delay message resulting from a change in said projected time of arrival or distance to task situs;

sending said antecedent message for said task and said delay message to said customer per the task-related channel and mode selections;

said server effecting a further display on said customer Internet-enabled device listing said time of arrival, updated with real time task person location data; and when said customer is not at said task situs, said further display and said updated time of arrival coordinating the substantially simultaneous visit of said task person and said customer at said task situs.

2. A computer-based method as claimed in claim 1 including said server effecting said displayed location data as a displayed map on said customer Internet-enabled device.

3. A computer-based method as claimed in claim 1 wherein said time-of-arrival data in said unique task data collection is a posted time-of-arrival, and the method includes one or both of:

(a) said server calculating an updated time-of-arrival data based upon said current location data from said GPS-enabled device; and replacing said posted time-of-arrival with said updated time-of-arrival data as said projected time of arrival; and (b) said server calculating an updated distance to task situs based upon said current location data from said GPS-enabled device; and posting distance to task situs as a proxy for an updated time-of-arrival data.

4. A computer-based method as claimed in claim 3 wherein the method includes said server calculating an updated time-of-arrival data and includes effecting the audible announcement of said projected time of arrival on said customer Internet-enabled device.

5. A computer-based method as claimed in claim 1 including said server effecting said displayed location data as a distance between said GPS enabled device and said task situs in miles or kilometers on said customer Internet-enabled device.

6. A computer-based method as claimed in claim 1
said server accepting customer-initiated selection of a communications channel and a mode selection for both said antecedent notice-of-arrival message and said delay message; and
sending said antecedent message for said task and said delay message, if needed, to said customer per the selections.

7. A computer-based method as claimed in claim 6 wherein said customer data includes said primary communications channel and multiple modes and said secondary communications channel and multiple modes, and
said server accepts customer-initiated selection of one communications channel from the group of communications channels comprising said primary communications channel associated with a customer phone and said secondary communications channel associated with a customer phone and one of said modes for the selected communications channel, thereby enabling said server to effect customer communication by: a voice message to the primary phone coupled to said primary communications channel, a text message to said primary phone coupled to said primary communications channel, a calendar alert associated with said primary phone coupled to said primary communications channel, a voice message to a secondary phone coupled to said secondary communications channel, a text message to said secondary phone coupled to said secondary communications channel; and a calendar alert associated with said primary phone coupled to said secondary communications channel.

8. A computer-based method as claimed in claim 7 wherein once said server accepts said customer-initiated selection of said one communications channel and one mode for said customer-initiated selection of said antecedent time period for notice-of-arrival:
said server sets as a default the selected one communications channel and one mode for said delay message; and
said server accepting a change the selected communications channels and modes until location data from said GPS-enabled device matches said task situs location.

9. A computer-based method as claimed in claim 7 wherein the customer Internet-enabled communications device is an Internet-enabled cellphone or a computer with a voice-enabled communications module and wherein the method includes:
said server effecting a display on said customer cellphone or computer listing: said task identifier, said task description, said projected time of arrival data and said assigned task person.

10. A computer-based method as claimed in claim 7 wherein the task related data provided for customers is deployed over said web-based server and a supplemental computer system having a supplemental database populated with said plurality of tasks represented by said unique task data collections, said customer data, said task person data and assigned GPS-enabled device data,
  said web-based server forwarding to said supplemental computer system and said supplemental database:
  said server accepted selection of one said communications channel, said server accepted selection of one communications mode, said server accepted selection of said time period for said antecedent message, and said server accepted selection of said communications channel and mode selection for said delay message.

11. A computer-based method as claimed in claim 7 wherein said server accepts the customer-initiated selection sent by an access point on the internet enabled device.

12. A computer-based method providing real time task-related data to customers seeking services, goods or consultations at a customer task situs location from a task person assigned to a unique task and an assigned GPS-enabled phone, computer tablet or electronic device coupled to a telecommunications network, said customer having an Internet-enabled communications device linked to said telecommunications network for communications over said telecommunications network, the method operative with a database populated with a plurality of tasks represented by unique task data collections, customer data, task person data and assigned GPS-enabled device data, one of said unique task data collections having said task situs location data, projected time of arrival data, task identifier data, task description, and task assignment data, said task person data including contact data for the assigned task person and said GPS enabled device, said customer data including customer name, identifying data and at least a primary and a secondary communications channel and mode, said database coupled to a web-based server and processor which in turn is coupled to said telecommunications network and enabled to communicate over said communications channels and modes per said customer data, the method comprising:
  gathering, in substantially realtime, a task person location from said assigned GPS-enabled phone and determining said projected time of arrival substantially continually based thereon;
  said server effecting a display on said customer Internet-enabled device listing: said task identifier, said task description, and said projected time of arrival data;
  said server accepting customer-initiated selection of one said communications channel;
  said server accepting customer-initiated selection of one communications mode from the group consisting of: a voice message through the selected communications channel to said customer, and a text message through the selected communications channel to said customer;
  said server accepting customer-initiated selection of a time period for an antecedent notice-of-arrival message, said antecedent message based upon said projected time of arrival for said task person at said task situs;
  said server accepting customer-initiated selection of a communications channel and a mode selection for a delay message resulting from a change in said projected time of arrival or distance to task situs; and
  sending said antecedent message for said task and said delay message, if needed, to said customer per the selections.

13. A computer-based method as claimed in claim 12 including changing said projected time of arrival based upon either distance to said task situs or prior task assignments tracked by said assigned GPS-enabled device.

14. A computer-based method as claimed in claim 12 wherein said time period for said antecedent message is one of a plurality of antecedent time periods and said server accepts customer-initiated selection of one of said plurality of antecedent time periods for said antecedent notice-of-arrival message.

15. A computer-based method as claimed in claim 12 wherein said customer data includes said primary communications channel and multiple modes and said secondary communications channel and multiple modes and,
  said server accepts customer-initiated selection of one communications channel from the group of communications channels comprising said primary communications channel associated with a customer phone and said secondary communications channel associated with a customer phone and one of said modes for the selected communications channel, thereby enabling said server to effect customer communication by: a voice message to the primary phone coupled to said primary communications channel, a text message to said primary phone coupled to said primary communications channel, a calendar alert associated with said primary phone coupled to said primary communications channel, a voice message to a secondary phone coupled to said secondary communications channel, a text message to said secondary phone coupled to said secondary communications channel; and a calendar alert associated with said primary phone coupled to said secondary communications channel.

16. A computer-based method as claimed in claim 15 wherein once said server accepts said customer-initiated selection of said one communications channel and one mode for said customer-initiated selection of said antecedent time period for notice-of-arrival:
  said server sets as a default the selected one communications channel and one mode for said delay message.

17. A computer-based method as claimed in claim 16 enabling said customer to change the selected communications channels and modes until location data from said UPS-enabled device matches said task situs location.

18. A computer-based method as claimed in claim 12 wherein the customer Internet-enabled communications device is an Internet-enabled cellphone or a computer with a voice-enabled communications module and wherein the method includes:
  said server effecting a display on said customer cellphone or computer listing: said task identifier, said task description, said projected time of arrival data and said assigned task person.

19. A computer-based method as claimed in claim 18 wherein:
  said server accepts said customer-initiated selection of said one communications mode from the group consisting of: a voice message to be sent from said server to said customer Internet-enabled device, a text message to be sent from said server to customer Internet-enabled device; a calendar alert to be sent from said server deliverable to said Internet-enabled device; an email message to be sent from said server deliverable to said Internet-enabled device;
  wherein the selected communications channel is coupled to said customer Internet-enabled device.

20. A computer-based method as claimed in claim 12 wherein said customer identifying data includes a password and the method includes:
  said server accepting said password prior to one or more of: said accepting customer-initiated selection of one said communications channel; said accepting customer-initiated selection of one communications mode; said accepting customer-initiated selection of said time period for said antecedent message, and said accepting customer-initiated selection of the communications channel and the mode selection for said delay message.

21. A computer-based method as claimed in claim 12 wherein:

the task related data provided for customers is deployed over said web-based server and a supplemental computer system having a supplemental database populated with said plurality of tasks represented by said unique task data collections, said customer data, said task person data and assigned GPS-enabled device data, said web-based server forwarding to said supplemental computer system and said supplemental database: said server accepted selection of one said communications channel, said server accepted selection of one communications mode, said server accepted selection of said time period for said antecedent message, and said server accepted selection of said communications channel and mode selection for said delay message.

22. A computer-based method providing real time task-related data to customers seeking services, goods or consultations at a customer task situs location from a task person assigned to a unique task and an assigned GPS-enabled phone, computer tablet or electronic device coupled to a telecommunications network, said customer having an Internet-enabled communications device linked to said telecommunications network for communications over said telecommunications network, the method operative with a database populated with a plurality of tasks represented by unique task data collections, customer data, task person data and assigned GPS-enabled device data, one of said unique task data collections having said task situs location data, projected time of arrival data, task identifier data, task description, and task assignment data, said task person data including contact data for the assigned task person and said GPS enabled device, said customer data including customer name, identifying data and at least a primary and a secondary communications channel and mode, said database coupled to a web-based server and processor which in turn is coupled to said telecommunications network and enabled to communicate over said communications channels and modes per said customer data, the method comprising:

gathering, in substantially realtime, a task person location from said assigned GPS-enabled phone and determining said projected time of arrival substantially continually based thereon;

said server effecting a visual or an audible presentation over said customer Internet-enabled device listing: said task identifier, said task description, and said projected time of arrival data;

said server accepting customer-initiated selection of one said communications channel;

said server accepting customer-initiated selection of one communications mode from the group consisting of: a voice message through the selected communications channel to said customer, and a text message through the selected communications channel to said customer, said server accepting customer-initiated selection of a time period for an antecedent notice-of-arrival message, said antecedent message based upon said projected time of arrival for said task person at said task situs;

said server accepting customer-initiated selection of a communications channel and a mode selection for a delay message resulting from a change in said projected time of arrival;

sending said antecedent message for said task and said delay message, if needed, to said customer per the selections.

23. A computer system providing real time task-related data to customers seeking services, goods or consultations at a customer task situs location from a task person assigned to a unique task and an assigned GPS-enabled phone, computer tablet or electronic device coupled to a telecommunications network, said customer having an Internet-enabled communications device linked to said telecommunications network for communications over said telecommunications network, a web-based server coupled to a telecommunications network and further coupled to said GPS-enabled device, said server having a processor maintaining a database populated with a plurality of tasks represented by unique task data collections, customer data, task person data, assigned GPS-enabled device data and current location data, one of said unique task data collections having said task situs location data, projected time of arrival data, task identifier data, task description, and task assignment data, said task person data including contact data for the assigned task person and said GPS enabled device, said customer data including customer name, identifying data and a customer communications channel and mode, said web-based server and processor coupled to said telecommunications network and enabled to communicate over said communications channels and modes per said customer data, comprising:

said server gathering, in substantially realtime, a task person location from said assigned GPS-enabled phone and determining said projected time of arrival substantially continually based thereon;

said server having means for effecting the display on said customer Internet-enabled device listing: said task identifier, said task description, said projected time of arrival data; and said current location data;

said server having one or more of: (i) means for mapping said current location data on a map displayed on said customer Internet-enabled device, or (ii) means for obtaining and displaying a distance between said GPS enabled device and said task situs in miles or kilometers on said customer Internet-enabled device;

said server permitting, with respect to said customer data, said communications channel and mode is a primary communications channel and mode, said customer data further including a secondary communications channel and mode, the method further including said server accepting customer-initiated selection of one said communications channel;

said server accepting customer-initiated selection of one communications mode from the group consisting of: a voice message through the selected communications channel to said customer, and a text message through the selected communications channel to said customer, said server accepting customer-initiated selection of a communications channel and a mode selection for one or the other or both of: (a) a time period for an antecedent notice-of-arrival message, said antecedent message based upon said projected time of arrival for said task person at said task situs, and (b) a delay message resulting from a change in said projected time of arrival or distance to task situs; and sending one or the other or both said antecedent message for said task and said delay message to said customer per the selections.

24. A computer system as claimed in claim 23 wherein said time-of-arrival data in said unique task data collection is a posted time-of-arrival, and the system includes:
said server having means for calculating an updated time-of-arrival data based upon said current location data from said GPS-enabled device;
means for re-posting said posted time-of-arrival with said updated time-of-arrival data as said projected time of arrival; and
said server having means for effecting an audible announcement of said projected time of arrival on said customer Internet-enabled device.

25. A computer system as claimed in claim 23 wherein said communications channel and mode is a primary communications channel and mode, said customer data further including a secondary communications channel and mode, wherein:
said server having first means for accepting customer-initiated selection of one said communications channel;
said server having second means for accepting customer-initiated selection of one communications mode from the group consisting of: a voice message through the selected communications channel to said customer, and a text message through the selected communications channel to said customer;
said server having third means for accepting customer-initiated selection of a time period for an antecedent notice-of-arrival message, said antecedent message based upon said projected time of arrival for said task person at said task situs;
said server having fourth means for accepting customer-initiated selection of a communications channel and a mode selection for a delay message resulting from a change in said projected time of arrival;
a communications interface coupled to said server for sending both said antecedent message for said task and said delay message, if needed, to said customer per the selections, said communications interface including an interactive voice response unit and text messager.

26. A computer system as claimed in claim 25:
wherein said customer data includes said primary communications channel and multiple modes and said secondary communications channel and multiple modes and
said server includes a fifth means for accepting customer-initiated selection of one communications channel from the group of communications channels comprising said primary communications channel associated with a customer phone and said secondary communications channel associated with a customer phone and one of said modes for the selected communications channel, thereby enabling said server to effect customer communication by: a voice message to the primary phone coupled to said primary communications channel, a text message to said primary phone coupled to said primary communications channel, a calendar alert associated with said primary phone coupled to said primary communications channel, a voice message to a secondary phone coupled to said secondary communications channel, a text message to said secondary phone coupled to said secondary communications channel; and a calendar alert associated with said primary phone coupled to said secondary communications channel; said communications interface further including a calendar module for effecting customer communication by said calendar alert.

27. A computer system as claimed in claim 23 wherein said computer system is a distributed computer system, wherein:
the distributed computer system includes a supplemental computer having a supplemental database populated with said plurality of tasks and plurality of unique task data collections, said customer data, and said task person data and assigned GPS-enabled device data,
a store and forward module operative with said web-based server for forwarding to said supplemental computer system and said supplemental database:
said server accepted selection of one said communications Channel, said server accepted selection of one communications mode, said server accepted selection of said time period for said antecedent message, and said server accepted selection of said communications channel and mode selection for said delay message.

28. A computer system providing real time task-related data to customers seeking services, goods or consultations at a customer task situs location from a task person assigned to a unique task and an assigned GPS-enabled phone, computer tablet or electronic device coupled to a telecommunications network, said customer having an Internet-enabled communications device linked to said telecommunications network for communications over said telecommunications network, a web-based server coupled to a telecommunications network and further coupled to said GPS-enabled device, said server having a processor maintaining a database populated with a plurality of tasks represented by unique task data collections, customer data, task person data, assigned GPS-enabled device data and current location data, one of said unique task data collections having said task situs location data, projected time of arrival data, task identifier data, task description, and task assignment data, said task person data including contact data for the assigned task person and said GPS enabled device, said customer data including customer name, identifying data and at least a primary and a secondary communications channel and mode, said web-based server and processor coupled to said telecommunications network and enabled to communicate over said communications channels and modes per said customer data, comprising:
said server gathering, in substantially realtime, a task person location from said assigned GPS-enabled phone and determining said projected time of arrival substantially continually based thereon;
said server having means for effecting a display on said customer Internet-enabled device listing: said task identifier, said task description, and said projected time of arrival data;
said server having first means for accepting customer-initiated selection of one said communications channel;
said server having second means for accepting customer-initiated selection of one communications mode from the group consisting of: a voice message through the selected communications channel to said customer, and a text message through the selected communications channel to said customer;
said server having third means for accepting customer-initiated selection of a time period for an antecedent notice-of-arrival message, said antecedent message based upon said projected time of arrival for said task person at said task situs;

said server having fourth means for accepting customer-initiated selection of a communications channel and a mode selection for a delay message resulting from a change in said projected time of arrival;

a timing module to generate said antecedent message based upon said projected time of arrival for said task person at said task situs and means to monitor said current location and to ascertain said change in said projected time of arrival, said timing module operative with said third and fourth means for accepting; and a communications interface coupled to said server for sending said antecedent message for said task and said delay message, if needed, to said customer per the selections, said communications interface including an interactive voice response unit and text messager.

29. A computer system as claimed in claim 28 wherein said customer data includes said primary communications channel and multiple modes and said secondary communications channel and multiple modes, and, said server has a fifth means for accepting customer-initiated selection of one communications channel from the group of communications channels comprising said primary communications channel associated with a customer phone and said secondary communications channel associated with a customer phone and one of said modes for the selected communications channel, thereby enabling said server to effect customer communication by: a voice message to the primary phone coupled to said primary communications channel, a text message to said primary phone coupled to said primary communications channel, a calendar alert associated with said primary phone coupled to said primary communications channel, a voice message to a secondary phone coupled to said secondary communications channel, a text message to said secondary phone coupled to said secondary communications channel; and a calendar alert associated with said primary phone coupled to said secondary communications channel;

said communications interface further including a calendar module for effecting customer communication by said calendar alert.

* * * * *